(12) United States Patent
Cheng et al.

(10) Patent No.: US 12,192,808 B2
(45) Date of Patent: Jan. 7, 2025

(54) RADIO SYNCHRONIZATION SIGNAL BLOCK RELATED IDLE MEASUREMENT CONFIGURATION

(71) Applicant: Qualcomm Incorporated, San Diego, CA (US)

(72) Inventors: Peng Cheng, Beijing (CN); Prasad Reddy Kadiri, San Diego, CA (US); Masato Kitazoe, Hachiouji (JP); Arvind Vardarajan Santhanam, San Diego, CA (US); Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/620,411

(22) PCT Filed: Jun. 19, 2019

(86) PCT No.: PCT/CN2019/091852
§ 371 (c)(1),
(2) Date: Dec. 17, 2021

(87) PCT Pub. No.: WO2020/252684
PCT Pub. Date: Dec. 24, 2020

(65) Prior Publication Data
US 2023/0146103 A1 May 11, 2023

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS

2018/0324678 A1 11/2018 Chen et al.
2019/0059064 A1* 2/2019 Ghosh ............... H04W 56/0005
(Continued)

FOREIGN PATENT DOCUMENTS

CN 109644417 A 4/2019
CN 109803282 A 5/2019
(Continued)

OTHER PUBLICATIONS

Huawei, et al., "Usage of SI and Dedicated Signalling for Early Measurement Configuration", 3GPP TSG-RAN WG2#106, R2-1907477, May 17, 2019 (May 17, 2019), 3 pages, section 2.
(Continued)

*Primary Examiner* — Chi H Pham
*Assistant Examiner* — Raul Rivas
(74) *Attorney, Agent, or Firm* — Holland & Hart LLP

(57) ABSTRACT

Methods, systems, and devices for wireless communications are described. A user equipment (UE) may receive synchronization signal block (SSB) related measurement configurations exclusively in a system information block (SIB). The UE may receive SSB frequency lists for idle measurements in both a SIB or a radio resource control (RRC) message, such as an RRC release message. In some examples, the UE may receive SSB related measurement configurations or SSB frequency lists for idle measurements in a SIB and an RRC message. Additionally or alternatively, the UE may receive SSB frequency lists in a SIB and an RRC message, while SSB measurement configurations for SSB frequencies out of a sync raster may exclusively be indicated in the RRC message. The UE may therefore experience improved cov-
(Continued)

erage and reliability and, in some examples, may promote low latency for wireless communications relating to multiple radio access technologies, among other benefits.

29 Claims, 19 Drawing Sheets

(56) References Cited

U.S. PATENT DOCUMENTS

| | | | | |
|---|---|---|---|---|
| 2019/0150161 | A1* | 5/2019 | Cheng | H04W 72/542 370/330 |
| 2020/0229132 | A1* | 7/2020 | Chen | H04W 74/0833 |

FOREIGN PATENT DOCUMENTS

| | | |
|---|---|---|
| EP | 3471469 A1 | 4/2019 |
| WO | WO-2019040292 A1 | 2/2019 |

OTHER PUBLICATIONS

Intel Corporation: "Discussion on SIB and Dedicated Configuration for Early Measurement Reporting", 3GPP TSG-RAN, WG2 Meeting #106, R2-1906422, May 17, 2019 (May 17, 2019), 5 pages, the whole document.

International Search Report and Written Opinion—PCT/ CN2019/ 091852—ISA/EPO—Mar. 19, 2020.

Supplementary European Search Report—EP19934076—Search Authority—the Hague—Dec. 19, 2022.

Vivo: "Measurement in Idle and Inactive States", 3GPP TSG-RAN WG2 Meeting #105, R2-1900261, 3rd Generation Partnership Project (3GPP), Mobile Competence Centre, 650, Route Des Lucioles, F-06921 Sophia-Antipolis Cedex, France, RAN HG2, No. Athens, Greece, Feb. 25, 2019-Mar. 1, 2019, Feb. 15, 2019, 3 Pages, XP051601659.

Qualcomm Incorporated: "Remaining Issues of NR Early Measurement Configuration", 3GPP TSG RAN WG2 Meeting #106, R2-1905544, Reno, Nevada, US, May 13-17, 2019, pp. 1-5.

\* cited by examiner

RADIO SYNCHRONIZATION SIGNAL BLOCK RELATED IDLE MEASUREMENT CONFIGURATION

CROSS REFERENCE TO RELATED APPLICATION

The present Application is a 371 national stage filing of International PCT Application No. PCT/CN2019/091852 by Cheng et al, entitled "NEW RADIO SYNCHRONIZATION SIGNAL BLOCK RELATED IDLE MEASUREMENT CONFIGURATION," filed Jun. 19, 2019, which is assigned to the assignee hereof, and which is expressly incorporated by reference in its entirety herein.

FIELD OF TECHNOLOGY

The following relates generally to wireless communications and more specifically to new radio (NR) synchronization signal block (SSB) related idle measurement configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices. Some wireless communications systems may support multiple radio access technologies, for example, such as 4G systems, 5G systems, and Wi-Fi systems (e.g., wireless local area network (WLAN) systems). Some communication devices may support multiple operating modes (also referred to as "radio resource control (RRC) states"). Communication devices may switch between one or more radio access technologies and operating modes. These communication devices may perform various measurements in an operating mode to facilitate carrier aggregation (CA) and handover determinations from a serving cell to a neighboring cell. As demand for communication efficiency increases, some wireless communications systems may fail to provide improvements to handling measurement configurations relating to multiple radio access technologies, as well as across multiple cells, and therefore improved techniques are desired.

SUMMARY

The described techniques relate to improved methods, systems, devices, and apparatuses that support new radio (NR) synchronization signal block (SSB) related idle measurement configuration. Generally, the described techniques enable a base station to transmit and a user equipment (UE) to receive SSB related measurement configurations exclusively in a system information block (SIB). The described techniques may enable a base station to transmit and a UE to receive one or more SSB frequency lists for idle measurements in either or both a SIB or a radio resource control (RRC) message, such as an RRC release message. In some examples, the described techniques may alternatively enable a base station to transmit and a UE to receive either or both SSB related measurement configurations and SSB frequency lists for idle measurements in a SIB and an RRC message. Additionally or alternatively, the described techniques may enable a base station to transmit and a UE to receive SSB frequency lists in a SIB and an RRC message, while SSB measurement configurations for SSB frequencies out of a sync raster may exclusively be indicated in the RRC message. The described techniques may therefore include features for improved coverage and reliability for wireless communications and, in some examples, may promote low latency for wireless communications relating to multiple radio access technologies, among other benefits.

A method of wireless communication at a UE is described. The method may include receiving a first message including a set of SSB measurement configurations, a first set of SSB frequencies, or a combination thereof, receiving a second message different from the first message, the second message including a second set of SSB frequencies, measuring a SSB frequency of the first set, a SSB frequency of the second set, or a combination thereof, where the measuring is according to a SSB measurement configuration of the set of SSB measurement configurations, and transmitting a measurement report based on the measuring.

An apparatus for wireless communication is described. The apparatus may include a processor, memory coupled with the processor, and instructions stored in the memory. The instructions may be executable by the processor to cause the apparatus to receive a first message including a set of SSB measurement configurations, a first set of SSB frequencies, or a combination thereof, receive a second message different from the first message, the second message including a second set of SSB frequencies, measure a SSB frequency of the first set, a SSB frequency of the second set, or a combination thereof, where the measuring is according to a SSB measurement configuration of the set of SSB measurement configurations, and transmit a measurement report based on the measuring.

Another apparatus for wireless communication is described. The apparatus may include means for receiving a first message including a set of SSB measurement configurations, a first set of SSB frequencies, or a combination thereof, receiving a second message different from the first message, the second message including a second set of SSB frequencies, measuring a SSB frequency of the first set, a SSB frequency of the second set, or a combination thereof, where the measuring is according to a SSB measurement configuration of the set of SSB measurement configurations, and transmitting a measurement report based on the measuring.

A non-transitory computer-readable medium storing code for wireless communication at a UE is described. The code may include instructions executable by a processor to receive a first message including a set of SSB measurement configurations, a first set of SSB frequencies, or a combination thereof, receive a second message different from the first message, the second message including a second set of SSB frequencies, measure a SSB frequency of the first set, a SSB frequency of the second set, or a combination thereof, where the measuring is according to a SSB measurement configuration of the set of SSB measurement configurations, and transmit a measurement report based on the measuring.

Some examples of the method, apparatuses, and non-transitory computer-readable medium described herein may further include operations, features, means, or instructions for determining a difference between the first set and the second set based on comparing SSB frequencies of the first set to SSB frequencies of the second set, where measuring the SSB frequency of the first set, the SSB frequency of the second set, or a combination thereof based on the difference between the first set and the second set.

Some examples of the method, apparatuses, and non-transitory computer-readable medium described herein may further include operations, features, means, or instructions for ignoring the first set based on the difference between the first set and the second set, where measuring the SSB frequency of the first set, the SSB frequency of the second set, or a combination thereof includes measuring the SSB frequency of the second set, and refraining from measuring the SSB frequency of the first set based at least in part on the ignoring.

Some examples of the method, apparatuses, and non-transitory computer-readable medium described herein may further include operations, features, means, or instructions for determining a subset of SSB frequencies based on comparing SSB frequencies of the first set to SSB frequencies of the second set, the subset of SSB frequencies including common SSB frequencies between the first set and the second set, and measuring the common SSB frequencies, where the common SSB frequencies includes the SSB frequency of the first set and the SSB frequency of the second set.

Some examples of the method, apparatuses, and non-transitory computer-readable medium described herein may further include operations, features, means, or instructions for identifying a first SSB-based measurement timing configuration (SMTC) associated with a serving cell based on the first message, or the second message, or a combination thereof, identifying a second SMTC associated with a target cell based on a third message, the third message including a SIB, and replacing the first SMTC of the serving cell with the second SMTC associated with the target cell.

In some examples of the method, apparatuses, and non-transitory computer-readable medium described herein, the SSB frequency of the first set, or the SSB frequency of the second set, or a combination thereof may be present in a sync raster or absent in the sync raster.

In some examples of the method, apparatuses, and non-transitory computer-readable medium described herein, the first message includes a first format based on a presence of the SSB frequency of the first set in the sync raster, the set of SSB measurement configurations relating to a cell selection by the UE or a cell reselection by the UE.

In some examples of the method, apparatuses, and non-transitory computer-readable medium described herein, the first format includes a NR SIB or a legacy-based SIB.

In some examples of the method, apparatuses, and non-transitory computer-readable medium described herein, receiving the first message may include operations, features, means, or instructions for receiving the set of SSB measurement configurations in the NR SIB or the legacy-based SIB based on the presence of the SSB frequency of the first set in the sync raster.

In some examples of the method, apparatuses, and non-transitory computer-readable medium described herein, the first message includes a second format based on an absence of the SSB frequency of the first set in the sync raster, the set of SSB measurement configurations, or a combination thereof relating to one or more of an idle state measurement by the UE or an inactive state measurement by the UE.

In some examples of the method, apparatuses, and non-transitory computer-readable medium described herein, the second format includes a NR SIB or a legacy-based SIB.

In some examples of the method, apparatuses, and non-transitory computer-readable medium described herein, receiving the first message may include operations, features, means, or instructions for receiving the set of SSB measurement configurations in the NR SIB or the legacy-based SIB based on the absence of the SSB frequency of the first set in the sync raster.

In some examples of the method, apparatuses, and non-transitory computer-readable medium described herein, the second format may be different from the first format.

In some examples of the method, apparatuses, and non-transitory computer-readable medium described herein, the SSB frequency of the first set, or the SSB frequency of the second set, or a combination therefore may be present in the sync raster or absent in the sync raster.

In some examples of the method, apparatuses, and non-transitory computer-readable medium described herein, each SSB frequency of the first set or each SSB frequency of the second set correspond to SSB measurement configurations of the set of SSB measurement configurations.

In some examples of the method, apparatuses, and non-transitory computer-readable medium described herein, the SSB measurement configuration includes one or more of a SMTC, a subcarrier spacing, an SSB index, a radio frequency spectrum band index, a measurement-type, and a cell quantity configuration.

In some examples of the method, apparatuses, and non-transitory computer-readable medium described herein, receiving the first message may include operations, features, means, or instructions for receiving a SIB including the set of SSB measurement configurations, or the first set of SSB frequencies, or a combination thereof.

In some examples of the method, apparatuses, and non-transitory computer-readable medium described herein, receiving the second message may include operations, features, means, or instructions for receiving an RRC message including the second set of SSB frequencies.

In some examples of the method, apparatuses, and non-transitory computer-readable medium described herein, the RRC message includes an RRC release message.

Some examples of the method, apparatuses, and non-transitory computer-readable medium described herein may further include operations, features, means, or instructions for receiving the first message, or the second message, or a combination thereof from a serving cell associated with the UE.

Some examples of the method, apparatuses, and non-transitory computer-readable medium described herein may further include operations, features, means, or instructions for identifying the second set of SSB frequencies, or a set of neighboring cells, or a combination thereof based on the second message, where the second set of SSB frequencies includes NR set of SSB frequencies.

Some examples of the method, apparatuses, and non-transitory computer-readable medium described herein may further include operations, features, means, or instructions for identifying presence of one or more SSB frequencies of the NR set of SSB frequencies in a sync raster, identifying one or more SSB measurement configurations associated with the one or more SSB frequencies of the NR set of SSB frequencies in the sync raster based on a NR SIB or a legacy-based SIB, and measuring the one or more SSB frequencies of the NR set of SSB frequencies according to the one or more SSB measurement configurations associated with the one or more SSB frequencies of the NR set of SSB frequencies in the sync raster.

Some examples of the method, apparatuses, and non-transitory computer-readable medium described herein may further include operations, features, means, or instructions for identifying absence of one or more SSB frequencies of the NR set of SSB frequencies in a sync raster, identifying one or more SSB measurement configurations associated with the one or more SSB frequencies of the NR set of SSB frequencies based on a NR SIB or a legacy-based SIB, and measuring the one or more SSB frequencies of the NR set of SSB frequencies according to the one or more SSB measurement configurations associated with the one or more SSB frequencies of the NR set of SSB frequencies.

Some examples of the method, apparatuses, and non-transitory computer-readable medium described herein may further include operations, features, means, or instructions for determining an absence of the SSB measurement configuration of the set of SSB measurement configurations associated with the SSB frequency of the first set, or the SSB frequency of the second set, or a combination thereof, and refraining from measuring one or more of the SSB frequency of the first set, or the SSB frequency of the second set, or a combination thereof based on the absence of the SSB measurement configuration.

Some examples of the method, apparatuses, and non-transitory computer-readable medium described herein may further include operations, features, means, or instructions for identifying a RRC mode, where the RRC mode includes an idle mode or an inactive mode, where measuring the SSB frequency of the first set, or the SSB frequency of the second set, or a combination thereof includes measuring, while in the idle mode or the inactive mode, the SSB frequency of the first set of SSB frequencies, or the SSB frequency of the second set of SSB frequencies, or a combination thereof.

Some examples of the method, apparatuses, and non-transitory computer-readable medium described herein may further include operations, features, means, or instructions for measuring the SSB frequency of the first set, or the SSB frequency of the second set, or a combination thereof based on a carrier aggregation (CA) capability or a multi-radio access technology dual-connectivity capability.

A method of wireless communication at a base station is described. The method may include transmitting a first message including a set of SSB measurement configurations, a first set of SSB frequencies, or a combination thereof, transmitting a second message different from the first message, the second message including a second set of SSB frequencies, and receiving a measurement report based on the first message, or the second message, or a combination thereof.

An apparatus for wireless communication is described. The apparatus may include a processor, memory coupled with the processor, and instructions stored in the memory. The instructions may be executable by the processor to cause the apparatus to transmit a first message including a set of SSB measurement configurations, a first set of SSB frequencies, or a combination thereof, transmit a second message different from the first message, the second message including a second set of SSB frequencies, and receive a measurement report based on the first message, or the second message, or a combination thereof.

Another apparatus for wireless communication is described. The apparatus may include means for transmitting a first message including a set of SSB measurement configurations, a first set of SSB frequencies, or a combination thereof, transmitting a second message different from the first message, the second message including a second set of SSB frequencies, and receiving a measurement report based on the first message, or the second message, or a combination thereof.

A non-transitory computer-readable medium storing code for wireless communication at a base station is described. The code may include instructions executable by a processor to transmit a first message including a set of SSB measurement configurations, a first set of SSB frequencies, or a combination thereof, transmit a second message different from the first message, the second message including a second set of SSB frequencies, and receive a measurement report based on the first message, or the second message, or a combination thereof.

In some examples of the method, apparatuses, and non-transitory computer-readable medium described herein, the SSB frequency of the first set, or the SSB frequency of the second set, or a combination thereof may be present in a sync raster or absent in the sync raster.

In some examples of the method, apparatuses, and non-transitory computer-readable medium described herein, the first message includes a first format based on a presence of the SSB frequency of the first set in the sync raster, the set of SSB measurement configurations relating to a cell selection by the UE or a cell reselection by the UE.

In some examples of the method, apparatuses, and non-transitory computer-readable medium described herein, the first format includes a NR SIB or a legacy-based SIB.

In some examples of the method, apparatuses, and non-transitory computer-readable medium described herein, transmitting the first message may include operations, features, means, or instructions for transmitting the set of SSB measurement configurations in the NR SIB or the legacy-based SIB based on the presence of the SSB frequency of the first set in the sync raster.

In some examples of the method, apparatuses, and non-transitory computer-readable medium described herein, the first message includes a second format based on an absence of the SSB frequency of the first set in the sync raster, the set of SSB measurement configurations, or a combination thereof.

In some examples of the method, apparatuses, and non-transitory computer-readable medium described herein, the second format includes a NR SIB or a legacy-based SIB.

In some examples of the method, apparatuses, and non-transitory computer-readable medium described herein, transmitting the first message may include operations, features, means, or instructions for transmitting the set of SSB measurement configurations in the NR SIB or the legacy-based SIB based on the absence of the SSB frequency of the first set in the sync raster.

In some examples of the method, apparatuses, and non-transitory computer-readable medium described herein, the second format may be different from the first format.

In some examples of the method, apparatuses, and non-transitory computer-readable medium described herein, transmitting the first message may include operations, features, means, or instructions for transmitting a SIB including the set of SSB measurement configurations, or the first set of SSB frequencies, or a combination thereof.

In some examples of the method, apparatuses, and non-transitory computer-readable medium described herein, transmitting the first message may include operations, features, means, or instructions for transmitting an RRC message including the second set of SSB frequencies.

In some examples of the method, apparatuses, and non-transitory computer-readable medium described herein, the RRC message includes an RRC release message.

Some examples of the method, apparatuses, and non-transitory computer-readable medium described herein may further include operations, features, means, or instructions for transmitting the RRC message may be based on a network synchronization.

In some examples of the method, apparatuses, and non-transitory computer-readable medium described herein, the first message, or the second message, or a combination thereof includes a SMTC.

A method of wireless communication at a UE is described. The method may include receiving a first message including a first set of SSB measurement configurations and a first set of SSB frequencies, receiving a second message different from the first message, the second message including a second set of SSB measurement configurations and a second set of SSB frequencies, measuring a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof, and transmitting a measurement report based on the measuring.

An apparatus for wireless communication is described. The apparatus may include a processor, memory coupled with the processor, and instructions stored in the memory. The instructions may be executable by the processor to cause the apparatus to receive a first message including a first set of SSB measurement configurations and a first set of SSB frequencies, receive a second message different from the first message, the second message including a second set of SSB measurement configurations and a second set of SSB frequencies, measure a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof, and transmit a measurement report based on the measuring.

Another apparatus for wireless communication is described. The apparatus may include means for receiving a first message including a first set of SSB measurement configurations and a first set of SSB frequencies, receiving a second message different from the first message, the second message including a second set of SSB measurement configurations and a second set of SSB frequencies, measuring a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof, and transmitting a measurement report based on the measuring.

A non-transitory computer-readable medium storing code for wireless communication at a UE is described. The code may include instructions executable by a processor to receive a first message including a first set of SSB measurement configurations and a first set of SSB frequencies, receive a second message different from the first message, the second message including a second set of SSB measurement configurations and a second set of SSB frequencies, measure a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof, and transmit a measurement report based on the measuring.

Some examples of the method, apparatuses, and non-transitory computer-readable medium described herein may further include operations, features, means, or instructions for determining a difference between the first set of SSB frequencies and the second set of SSB frequencies based on comparing SSB frequencies of the first of SSB frequencies to SSB frequencies of the second set of SSB frequencies, determining an additional difference between the first set of SSB measurement configurations and the second set of SSB measurement configurations based on comparing SSB measurement configurations of the first set of SSB measurement configurations to SSB measurements configurations of the second set of SSB measurement configurations, where measuring the SSB frequency of the first set of SSB frequencies, or the SSB frequency of the second set of SSB frequencies, or a combination thereof based on one or more of the difference and the additional difference.

Some examples of the method, apparatuses, and non-transitory computer-readable medium described herein may further include operations, features, means, or instructions for ignoring the first set of SSB frequencies and the first set of SSB measurement configurations based on one or more of the difference and the additional difference, where measuring the SSB frequency of the first set of SSB frequencies, or the SSB frequency of the second set of SSB frequencies, or a combination thereof includes measuring the SSB frequency of the second set of SSB frequencies, and ignoring the SSB frequency of the first set of SSB frequencies.

Some examples of the method, apparatuses, and non-transitory computer-readable medium described herein may further include operations, features, means, or instructions for determining a subset of SSB frequencies based on comparing SSB frequencies of the first set of SSB frequencies to SSB frequencies of the second set of SSB frequencies, the subset of SSB frequencies including common SSB frequencies between the first set of SSB frequencies and the second set of SSB frequencies, determining a subset of SSB measurement configurations based on comparing measurement configurations of the first set of SSB measurement configurations to measurement configurations of the second set of SSB measurement configurations, the subset of SSB measurement configurations including common measurement configurations between the first set of SSB measurement configurations and the second set of SSB measurement configurations, and measuring the common SSB frequencies according to the common measurement configurations, where the common SSB frequencies includes the SSB frequency of the first set of SSB frequencies and the SSB frequency of the second set of SSB frequencies.

In some examples of the method, apparatuses, and non-transitory computer-readable medium described herein, the SSB frequency of the first set of SSB frequencies may be present in a sync raster or absent in the sync raster.

In some examples of the method, apparatuses, and non-transitory computer-readable medium described herein, the first message includes a first format based on a presence of the SSB frequency of the first set of SSB frequencies in the sync raster, the first set of SSB measurement configurations, or a combination thereof relating to a cell selection by the UE or a cell reselection by the UE.

In some examples of the method, apparatuses, and non-transitory computer-readable medium described herein, the first format includes a NR SIB or a legacy-based SIB.

In some examples of the method, apparatuses, and non-transitory computer-readable medium described herein, receiving the first message may include operations, features, means, or instructions for receiving the first set of SSB measurement configurations in the NR SIB or the legacy-based SIB based on the presence of the SSB frequency of the first set of SSB frequencies in the sync raster.

In some examples of the method, apparatuses, and non-transitory computer-readable medium described herein, the first message includes a second format based on an absence of the SSB frequency of the first set of SSB frequencies in the sync raster, the first set of SSB measurement configurations, or a combination thereof relating to one or more of an idle state measurement by the UE or an inactive state measurement by the UE.

In some examples of the method, apparatuses, and non-transitory computer-readable medium described herein, the second format includes a NR SIB or a legacy-based SIB.

In some examples of the method, apparatuses, and non-transitory computer-readable medium described herein, receiving the first message may include operations, features, means, or instructions for receiving the first set of SSB measurement configurations in the NR SIB or the legacy-based SIB based on the absence of the SSB frequency of the first set of SSB frequencies in the sync raster.

In some examples of the method, apparatuses, and non-transitory computer-readable medium described herein, the second format may be different from the first format.

In some examples of the method, apparatuses, and non-transitory computer-readable medium described herein, the SSB frequency of the first set of SSB frequencies, or the SSB frequency of the second set of SSB frequencies, or a combination thereof may be present in the sync raster or absent in the sync raster.

In some examples of the method, apparatuses, and non-transitory computer-readable medium described herein, each SSB frequency of the first set of SSB frequencies correspond to SSB measurement configurations of the first set of SSB measurement configurations, and each SSB frequency of the second set of SSB frequencies correspond to SSB measurement configuration of the second set of SSB measurement configurations.

In some examples of the method, apparatuses, and non-transitory computer-readable medium described herein, the measurement configuration of the first set of SSB measurement configurations, or the measurement configuration of the second set of SSB measurement configurations, or a combination thereof includes one or more of a SMTC, a subcarrier spacing, an SSB index, a radio frequency spectrum band index, a measurement-type, and a cell quantity configuration.

In some examples of the method, apparatuses, and non-transitory computer-readable medium described herein, receiving the first message may include operations, features, means, or instructions for receiving a SIB including the first set of SSB measurement configurations or the first set of SSB frequencies, or a combination thereof.

In some examples of the method, apparatuses, and non-transitory computer-readable medium described herein, receiving the second message may include operations, features, means, or instructions for receiving an RRC message including the second set of SSB measurement configurations or the second set of SSB frequencies.

In some examples of the method, apparatuses, and non-transitory computer-readable medium described herein, the RRC message includes an RRC release message.

Some examples of the method, apparatuses, and non-transitory computer-readable medium described herein may further include operations, features, means, or instructions for receiving the second message from a serving cell associated with the UE.

Some examples of the method, apparatuses, and non-transitory computer-readable medium described herein may further include operations, features, means, or instructions for identifying a first SMTC associated with a serving cell based on the first message or the second message, or a combination thereof, identifying a second SMTC associated with a target cell based on a third message, the third message including a SIB, and replacing the first SMTC of the serving cell with the second SMTC associated with the target cell.

Some examples of the method, apparatuses, and non-transitory computer-readable medium described herein may further include operations, features, means, or instructions for determining whether a SMTC may be valid during a cell reselection based on an indication.

Some examples of the method, apparatuses, and non-transitory computer-readable medium described herein may further include operations, features, means, or instructions for identifying the second set of SSB frequencies, or a set of neighboring cells, or a combination thereof based on the second message, where the second set of SSB frequencies includes NR set of SSB frequencies.

Some examples of the method, apparatuses, and non-transitory computer-readable medium described herein may further include operations, features, means, or instructions for identifying presence of one or more SSB frequencies of the NR set of SSB frequencies in a sync raster, identifying one or more measurement configurations associated with the one or more SSB frequencies of the NR set of SSB frequencies in the sync raster based on a NR SIB or a legacy-based SIB, and measuring the one or more SSB frequencies of the NR set of SSB frequencies according to the one or more measurement configurations associated with the one or more SSB frequencies of the NR set of SSB frequencies in the sync raster.

Some examples of the method, apparatuses, and non-transitory computer-readable medium described herein may further include operations, features, means, or instructions for identifying absence of one or more SSB frequencies of the NR set of SSB frequencies in a sync raster, identifying one or more measurement configurations associated with the one or more SSB frequencies of the NR set of SSB frequencies based on a NR SIB or a legacy-based SIB, and measuring the one or more SSB frequencies of the NR set of SSB frequencies according to the one or more measurement configurations associated with the one or more SSB frequencies of the NR set of SSB frequencies.

Some examples of the method, apparatuses, and non-transitory computer-readable medium described herein may further include operations, features, means, or instructions for determining an absence of a measurement configuration of the first set of SSB measurement configurations associated with the SSB frequency of the first set of SSB frequencies, or the second set of SSB measurement configurations associated with the SSB frequency of the second set of SSB frequencies, or a combination thereof, and refraining from measuring the SSB frequency of the first set of SSB frequencies, or the SSB frequency of the second set of SSB frequencies, or a combination thereof based on the absence.

Some examples of the method, apparatuses, and non-transitory computer-readable medium described herein may further include operations, features, means, or instructions for identifying a RRC mode, where the RRC mode includes an idle mode or an inactive mode, where measuring the SSB frequency of the first set of SSB frequencies, or the SSB frequency of the second set of SSB frequencies, or a combination thereof includes measuring, while in the idle mode or the inactive mode, the SSB frequency of the first set of SSB frequencies, or the SSB frequency of the second set of SSB frequencies, or a combination thereof.

Some examples of the method, apparatuses, and non-transitory computer-readable medium described herein may further include operations, features, means, or instructions for measuring the SSB frequency of the first set, or the SSB frequency of the second set, or a combination thereof based on a CA capability or a multi-radio access technology dual-connectivity capability.

A method of wireless communication at a base station is described. The method may include transmitting a first message including a first set of SSB measurement configurations and a first set of SSB frequencies, transmitting a second message different from the first message, the second message including a second set of SSB measurement configurations and a second set of SSB frequencies, and receiving a measurement report based on the first message, or the second message, or a combination thereof.

An apparatus for wireless communication is described. The apparatus may include a processor, memory coupled with the processor, and instructions stored in the memory. The instructions may be executable by the processor to cause the apparatus to transmit a first message including a first set of SSB measurement configurations and a first set of SSB frequencies, transmit a second message different from the first message, the second message including a second set of SSB measurement configurations and a second set of SSB frequencies, and receive a measurement report based on the first message, or the second message, or a combination thereof.

Another apparatus for wireless communication is described. The apparatus may include means for transmitting a first message including a first set of SSB measurement configurations and a first set of SSB frequencies, transmitting a second message different from the first message, the second message including a second set of SSB measurement configurations and a second set of SSB frequencies, and receiving a measurement report based on the first message, or the second message, or a combination thereof.

A non-transitory computer-readable medium storing code for wireless communication at a base station is described. The code may include instructions executable by a processor to transmit a first message including a first set of SSB measurement configurations and a first set of SSB frequencies, transmit a second message different from the first message, the second message including a second set of SSB measurement configurations and a second set of SSB frequencies, and receive a measurement report based on the first message, or the second message, or a combination thereof.

In some examples of the method, apparatuses, and non-transitory computer-readable medium described herein, the first message includes a first format based on a presence of the SSB frequency of the first set of SSB frequencies in the sync raster, the first set of SSB measurement configurations, or a combination thereof.

In some examples of the method, apparatuses, and non-transitory computer-readable medium described herein, the first format includes a NR SIB or a legacy-based SIB.

In some examples of the method, apparatuses, and non-transitory computer-readable medium described herein, transmitting the first message may include operations, features, means, or instructions for transmitting the first set of SSB measurement configurations in the NR SIB or the legacy-based SIB based on the presence of the SSB frequency of the first set of SSB frequencies in the sync raster.

In some examples of the method, apparatuses, and non-transitory computer-readable medium described herein, the first message includes a second format based on an absence of the SSB frequency of the first set of SSB frequencies in the sync raster, the first set of SSB measurement configurations, or a combination thereof.

In some examples of the method, apparatuses, and non-transitory computer-readable medium described herein, the second format includes a NR SIB or a legacy-based SIB.

In some examples of the method, apparatuses, and non-transitory computer-readable medium described herein, transmitting the first message may include operations, features, means, or instructions for transmitting the first set of SSB measurement configurations in the NR SIB or the legacy-based SIB based on the absence of the SSB frequency of the first set of SSB frequencies in the sync raster.

In some examples of the method, apparatuses, and non-transitory computer-readable medium described herein, the second format may be different from the first format.

In some examples of the method, apparatuses, and non-transitory computer-readable medium described herein, transmitting the first message may include operations, features, means, or instructions for transmitting a SIB including the first set of SSB measurement configurations or the first set of SSB frequencies, or a combination thereof.

In some examples of the method, apparatuses, and non-transitory computer-readable medium described herein, transmitting the second message may include operations, features, means, or instructions for transmitting an RRC message including the second set of SSB measurement configurations or the second set of SSB frequencies.

In some examples of the method, apparatuses, and non-transitory computer-readable medium described herein, the RRC message includes an RRC release message.

Some examples of the method, apparatuses, and non-transitory computer-readable medium described herein may further include operations, features, means, or instructions for transmitting the RRC message including the second set of SSB measurement configurations may be based on a network synchronization.

In some examples of the method, apparatuses, and non-transitory computer-readable medium described herein, the first message, or the second message, or a combination thereof includes a SMTC.

In some examples of the method, apparatuses, and non-transitory computer-readable medium described herein, the first message, or the second message, or a combination thereof includes an indication of whether a SMTC may be valid during a cell reselection.

A method of wireless communication at a UE is described. The method may include receiving a first message including a set of SSB measurement configurations, or a first set of SSB frequencies, or a combination thereof, receiving a second message including a second set of SSB frequencies absent in a sync raster, measuring a SSB frequency of the first set, or a SSB frequency of the second set, or a combination thereof, where the measuring is according to a SSB measurement configuration of the set of SSB measurement configurations, and transmitting a measurement report based on the measuring.

An apparatus for wireless communication is described. The apparatus may include a processor, memory coupled with the processor, and instructions stored in the memory. The instructions may be executable by the processor to cause the apparatus to receive a first message including a set of SSB measurement configurations, or a first set of SSB frequencies, or a combination thereof, receive a second message including a second set of SSB frequencies absent in a sync raster, measure a SSB frequency of the first set, or a SSB frequency of the second set, or a combination thereof, where the measuring is according to a SSB measurement configuration of the set of SSB measurement configurations, and transmit a measurement report based on the measuring.

Another apparatus for wireless communication is described. The apparatus may include means for receiving a first message including a set of SSB measurement configurations, or a first set of SSB frequencies, or a combination thereof, receiving a second message including a second set of SSB frequencies absent in a sync raster, measuring a SSB frequency of the first set, or a SSB frequency of the second set, or a combination thereof, where the measuring is according to a SSB measurement configuration of the set of SSB measurement configurations, and transmitting a measurement report based on the measuring.

A non-transitory computer-readable medium storing code for wireless communication at a UE is described. The code may include instructions executable by a processor to receive a first message including a set of SSB measurement configurations, or a first set of SSB frequencies, or a combination thereof, receive a second message including a second set of SSB frequencies absent in a sync raster, measure a SSB frequency of the first set, or a SSB frequency of the second set, or a combination thereof, where the measuring is according to a SSB measurement configuration of the set of SSB measurement configurations, and transmit a measurement report based on the measuring.

Some examples of the method, apparatuses, and non-transitory computer-readable medium described herein may further include operations, features, means, or instructions for determining a difference between the first set and the second set based on comparing SSB frequencies of the first set to SSB frequencies of the second set, where measuring the SSB frequency of the first set, or the SSB frequency of the second set, or a combination thereof based on the difference between the first set and the second set.

Some examples of the method, apparatuses, and non-transitory computer-readable medium described herein may further include operations, features, means, or instructions for ignoring the first set based on the difference between the first set and the second set, where measuring the SSB frequency of the first set, or the SSB frequency of the second, or a combination thereof includes measuring the SSB frequency of the second set, and refraining from measuring the SSB frequency of the first set based at least in part on the ignoring.

Some examples of the method, apparatuses, and non-transitory computer-readable medium described herein may further include operations, features, means, or instructions for determining a subset of SSB frequencies based on comparing SSB frequencies of the first set to SSB frequencies of the second set, the subset of SSB frequencies including common SSB frequencies between the first set and the second set, and measuring the common SSB frequencies, where the common SSB frequencies includes the SSB frequency of the first set and the SSB frequency of the second set.

Some examples of the method, apparatuses, and non-transitory computer-readable medium described herein may further include operations, features, means, or instructions for determining whether a SMTC may be valid during a cell reselection based on an indication.

In some examples of the method, apparatuses, and non-transitory computer-readable medium described herein, the second message includes an RRC message including the indication.

In some examples of the method, apparatuses, and non-transitory computer-readable medium described herein, the RRC message includes an RRC release message.

Some examples of the method, apparatuses, and non-transitory computer-readable medium described herein may further include operations, features, means, or instructions for determining that the SMTC relates to SSB frequencies of the first set of SSB frequencies present in the sync raster, and obtaining, based on the SMTC being invalid, a second SMTC from a target cell according to a third message from the target cell, the third message including a SIB.

Some examples of the method, apparatuses, and non-transitory computer-readable medium described herein may further include operations, features, means, or instructions for determining that the SMTC relates to SSB frequencies of the second set of SSB frequencies absent in the sync raster, and refraining from measuring the SSB frequencies of the second set of SSB frequencies based on the SMTC being invalid.

In some examples of the method, apparatuses, and non-transitory computer-readable medium described herein, the second message may be different from the first message.

In some examples of the method, apparatuses, and non-transitory computer-readable medium described herein, the SSB frequency of the first set of SSB frequencies may be present in the sync raster or absent in the sync raster.

In some examples of the method, apparatuses, and non-transitory computer-readable medium described herein, the first message includes a first format based on a presence of the SSB frequency of the first set of SSB frequencies in the sync raster, the first set of SSB measurement configurations relating to a cell selection by the UE or a cell reselection by the UE.

In some examples of the method, apparatuses, and non-transitory computer-readable medium described herein, the first format includes a NR SIB or a legacy-based SIB.

In some examples of the method, apparatuses, and non-transitory computer-readable medium described herein, receiving the first message may include operations, features, means, or instructions for receiving the first set of SSB measurement configurations in the NR SIB or the legacy-based SIB based on the presence of the SSB frequency of the first set of SSB frequencies in the sync raster.

In some examples of the method, apparatuses, and non-transitory computer-readable medium described herein, the first message includes a second format based on an absence of the SSB frequency of the first set of SSB frequencies in the sync raster, the first set of SSB measurement configurations relating to one or more of an idle state measurement by the UE or an inactive state measurement by the UE.

In some examples of the method, apparatuses, and non-transitory computer-readable medium described herein, the second format includes a NR SIB or a legacy-based SIB.

In some examples of the method, apparatuses, and non-transitory computer-readable medium described herein, receiving the first message may include operations, features, means, or instructions for receiving the first set of SSB measurement configurations in the NR SIB or the legacy-based SIB based on the absence of the SSB frequency of the first set of SSB frequencies in the sync raster.

In some examples of the method, apparatuses, and non-transitory computer-readable medium described herein, the second format may be different from the first format.

A method of wireless communication at a base station is described. The method may include transmitting a first message including a set of SSB measurement configurations, or a first set of SSB frequencies, or a combination thereof, transmitting a second message including a second set of SSB frequencies absent in a sync raster, and receiving a measurement report based on the first message, or the second message, or a combination thereof.

An apparatus for wireless communication is described. The apparatus may include a processor, memory coupled with the processor, and instructions stored in the memory. The instructions may be executable by the processor to cause the apparatus to transmit a first message including a set of SSB measurement configurations, or a first set of SSB frequencies, or a combination thereof, transmit a second message including a second set of SSB frequencies absent in a sync raster, and receive a measurement report based on the first message, or the second message, or a combination thereof.

Another apparatus for wireless communication is described. The apparatus may include means for transmitting a first message including a set of SSB measurement configurations, or a first set of SSB frequencies, or a combination thereof, transmitting a second message including a second set of SSB frequencies absent in a sync raster, and receiving a measurement report based on the first message, or the second message, or a combination thereof.

A non-transitory computer-readable medium storing code for wireless communication at a base station is described. The code may include instructions executable by a processor to transmit a first message including a set of SSB measurement configurations, or a first set of SSB frequencies, or a combination thereof, transmit a second message including a second set of SSB frequencies absent in a sync raster, and receive a measurement report based on the first message, or the second message, or a combination thereof.

In some examples of the method, apparatuses, and non-transitory computer-readable medium described herein, the first message, or the second message, or a combination thereof includes a SMTC.

In some examples of the method, apparatuses, and non-transitory computer-readable medium described herein, the first message, or the second message, or a combination thereof includes an indication of whether a SMTC may be valid during a cell reselection.

In some examples of the method, apparatuses, and non-transitory computer-readable medium described herein, the first message includes an RRC message or a SIB.

In some examples of the method, apparatuses, and non-transitory computer-readable medium described herein, the second message includes an RRC message or a SIB.

In some examples of the method, apparatuses, and non-transitory computer-readable medium described herein, the RRC message includes an RRC release message.

In some examples of the method, apparatuses, and non-transitory computer-readable medium described herein, the second message may be different from the first message.

DETAILED DESCRIPTION

Figure 1:
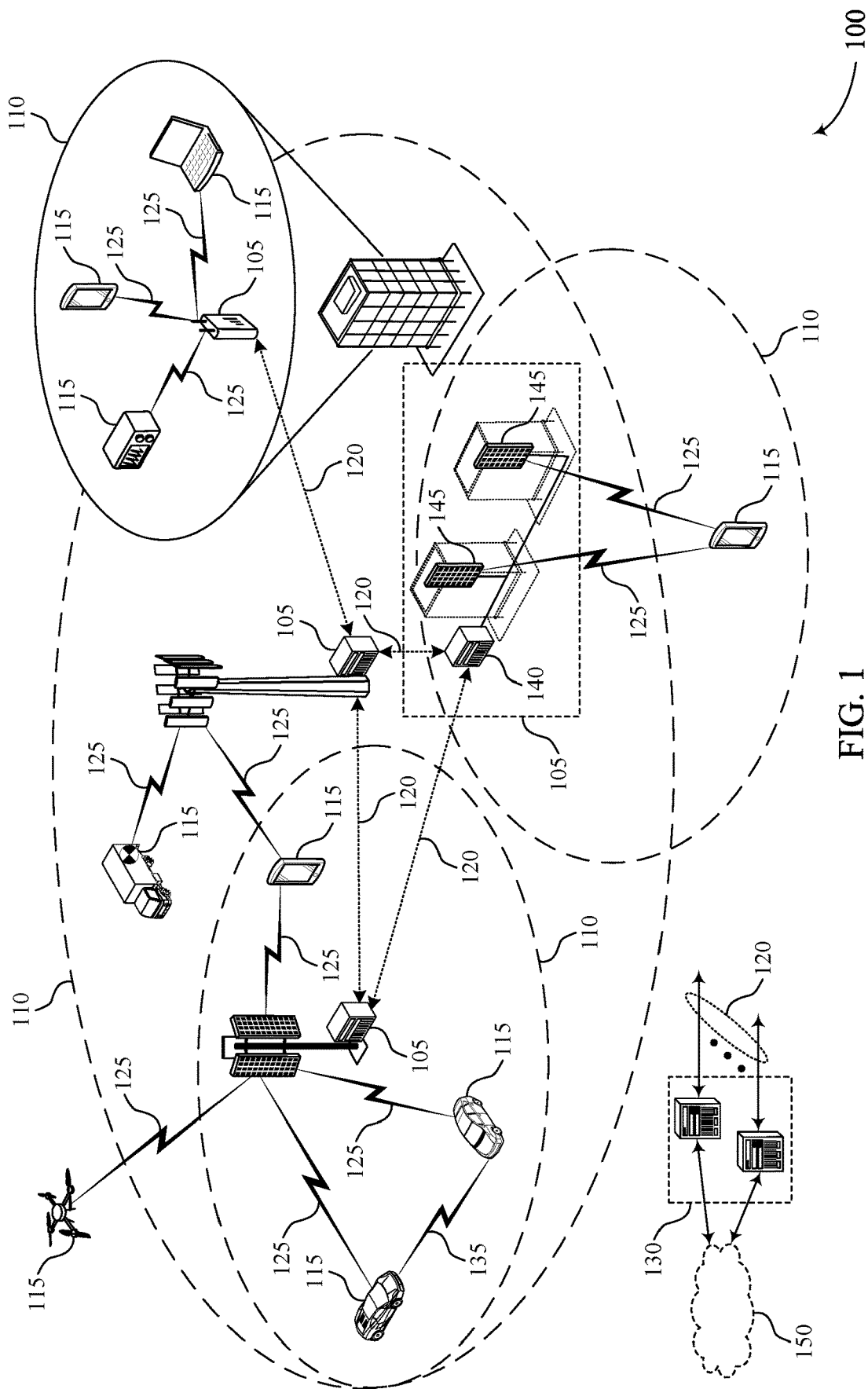
FIGS. 1 and 2 illustrate examples of a wireless communications system that supports new radio (NR) synchronization signal block (SSB) related idle measurement configuration in accordance with aspects of the present disclosure.

Some communication devices, which may be otherwise known as a user equipment (UE) may support multiple radio access technologies, for example, such as 4G systems, 5G systems, and the like. Communication devices may similarly support multiple operating modes to meet requirements across multiple radio access technologies. For example, between 4G systems and 5G systems, communication devices may support a connected state, an idle state, and an inactive state. A communication device in a connected state may switch to an idle state with a connection release, and subsequently may return to the connected state with a connection establishment. The communication device may, alternatively, when in an inactive state switch to a connected state or idle state. The multiple operating modes therefore allow communication devices to operate effectively (e.g., have continuous coverage, experience low latency and power saving) across one or more cells in a geographic coverage area.

Some communication devices may assess a serving cell, as well as neighboring cells for cell selection or cell reselection. In some examples, a communication device may evaluate a serving cell and neighboring cells for cell selection or cell reselection when operating in an idle state or an inactive state. In cell selection or cell reselection, a communication device may change a cell after the communication device has camped on the cell and remained in an idle state or an inactive state for some period. Thus, cell selection and cell reselection may allow the communication device to switch to a connected state on a cell that meets a certain criteria (e.g., a signal strength) among all candidate cells to which the communication device may be allowed to camp on. Some communication devices may receive information from base stations of corresponding cells, and evaluate each cell for cell selection or cell reselection based on the information. The information may include measurement configuration, which may relate to measurement objectives, such as frequencies, candidate cells, reporting configurations, and the like.

By way of example, some communication devices operating under 4G systems, such as Long-Term Advanced (LTE) carrier aggregation (CA) may receive measurement configurations as part of a radio resource control (RRC) message (e.g. an RRC connection release message) or a system information block (SIB) (e.g., a SIB5). An RRC connection release message or SIB may include a list of frequencies for communication devices to measure while in an idle state or an inactive state. Each frequency in the list may have a corresponding measurement configuration. Thus, some communication devices may receive measurement configurations in an RRC message or SIB for idle state measurement or inactive state measurements, both which may be referred to as "early measurements." In some examples, list of frequencies and measurement configurations may be same or different in an RRC message and a SIB.

Some communication devices may override a measurement configuration. For example, if a communication device receives measurement configuration in an RRC message, the communication device may override a measurement configuration provided in a SIB. In some examples, information in a measurement configuration provided in a SIB may be used in conjunction with information in a measurement configuration provided in an RRC message, or vice-versa. For example, a frequency configuration provided in a SIB may be used by a communication device for a frequency in a frequency list provided in an RRC message. Some communication devices may continue performing SIB-based measurements after cell reselection (e.g., periodic or aperiodic measurements based on device implementation). For example, after cell reselection, if a SIB of a target cell includes an idle state inter-frequency measurement configuration, some communication devices may continue performing idle state measurement and update the configuration according to the SIB of the target cell. Alternatively, after cell reselection, if the SIB of the target cell includes no frequency configuration for the idle state measurements, some communication devices may stop performing idle state inter-frequency measurements.

In 5G systems, communication devices may receive synchronization signal block (SSB) related measurement configurations for idle state or inactive state measurements. In some examples, SSB related measurement configurations for cell selection or cell reselection may be included in a new radio (NR) SIB, such as a SIB2/4. SSB related measurement configuration may include, but is not limited to, an SSB-based measurement timing configuration (SMTC) to limit communication devices to certain resources to reduce power consumption. The SSB related measurement configuration may, additionally or alternatively, include a subcarrier spacing, an SSB measurement indication, a frequency band indication, a measurement-type indication (e.g., received signal strength indicator (RSSI), and the like), or a cell quality derivation configuration, or a combination thereof.

In some examples of 5G systems, SSB related measurement configuration may have SSB frequencies located out of a sync raster, and an NR SIB may only include SSB frequencies in a sync raster. Therefore, in 5G systems, some communication devices may experience challenges with timing references between cells. Within an SMTC period and on configured SSB or reference signals, some communication devices may conduct measurements for cell selection or cell reselection. When SMTC information is included in an RRC message (e.g., RRC connection release message), timing may be based on a timing reference of a primary cell (also referred to as a "serving cell"). However, some communication devices may move to other cells, for example, other than the original primary cell. These cells may not be in synchronization with the original primary cell. Therefore, as demand for communication efficiency and improvements to wireless communication systems increases, improved techniques relating to means for communication devices to determine or obtain timing reference for SMTC information in idle state and inactive state measurement configuration when a serving cell changes are desired.

Generally, the described techniques enable a base station to transmit and a UE to receive SSB related measurement configurations exclusively in a SIB. The described techniques may enable a base station to transmit and a UE to receive one or more SSB frequency lists for idle measurements in either or both a SIB or an RRC message, such as an RRC release message. In some examples, the described techniques may alternatively enable a base station to transmit and a UE to receive either or both SSB related measurement configurations and SSB frequency lists for idle measurements in a SIB and an RRC message. Additionally or alternatively, the described techniques may enable a base station to transmit and a UE to receive SSB frequency lists in a SIB and an RRC message, while SSB measurement configurations for SSB frequencies out of a sync raster may exclusively be indicated in the RRC message.

Particular aspects of the subject matter described herein may be implemented to realize one or more advantages. The described techniques may support improvements in power savings, among other advantages. As such, supported techniques may include improved UE operations and, in some examples, may promote UE efficiencies, UE coverage, among other benefits in wireless communications systems. Aspects of the disclosure are initially described in the context of a wireless communications system. Aspects of the disclosure are then illustrated by and described with reference to process flows that relate to NR SSB related idle measurement configuration. Aspects of the disclosure are further illustrated by and described with reference to apparatus diagrams, system diagrams, and flowcharts that relate to NR SSB related idle measurement configuration.

FIG. 1 illustrates an example of a wireless communications system 100 that supports NR SSB related idle measurement configuration in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrow band IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrow band protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The wireless communications system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a CA configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may enable base stations 105 to transmit and UEs 115 to receive SSB related measurement configurations exclusively in a SIB. The wireless communications system 100 may enable base stations 105 to transmit and UEs 115 to receive one or more SSB frequency lists for idle measurements in either or both a SIB or an RRC message, such as an RRC release message. In some examples, the wireless communications system 100 may alternatively enable base stations 105 to transmit and UEs 115 to receive SSB related measurement configurations and SSB frequency lists for idle measurements in a SIB or an RRC message, or both. Additionally or alternatively, the wireless communications system 100 may enable base stations 105 to transmit and UEs 115 to receive SSB frequency lists in a SIB and an RRC message, while SSB measurement configurations for SSB frequencies out of a sync raster may exclusively be indicated in the RRC message. The wireless communications system 100 may therefore include features for improved coverage and reliability for wireless communications in the wireless communications system 100 and, in some examples, may promote low latency for wireless communications relating to multiple radio access technologies for base stations 105 and UEs 115, among other benefits.

Figure 2:
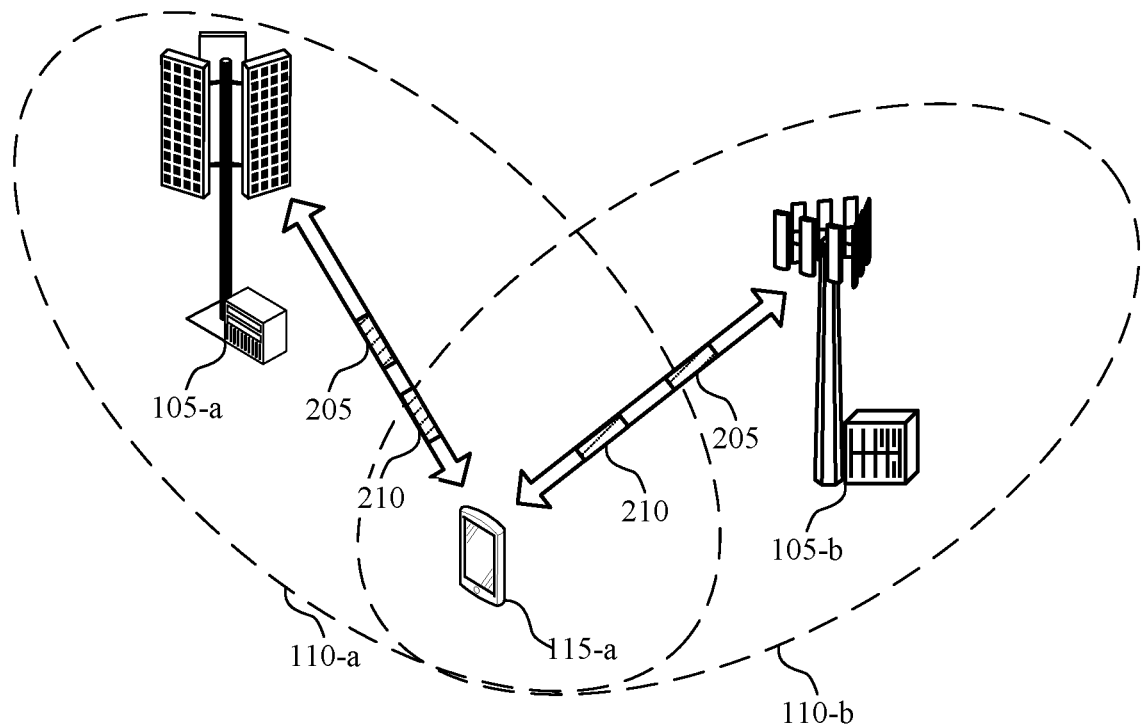

FIG. 2 illustrates an example of a wireless communications system 200 that supports NR SSB related idle measurement configuration in accordance with aspects of the present disclosure. The wireless communications system 200 may include UE 115-a and multiple base stations 105, such as base station 105-a, 105-b, which may be examples of the corresponding devices described with reference to FIG. 1. In some examples, base station 105-a may be a serving base station covering a serving cell 110-a, while base station 105-b may be a neighboring base station covering a neighboring cell 110-b. In some examples, the wireless communications system 200 may implement aspects of the wireless communications system 100. For example, UE 115-a and base stations 105-a, 105-b may improve messaging and management of NR SSB related idle measurement configuration for idle state measurements.

In the wireless communications system 200, UE 115-a may support cell selection or cell reselection relating to base stations 105-a, 105-b. Base stations 105-a, 105-b may support multiple radio access technologies, such as 4G systems, 5G systems, and the like, and similarly UE 115-a may support dual-connectivity capabilities and CA capabilities. As part of cell selection or cell reselection, UE 115-a may receive measurement configuration (also referred to as SSB measurement configurations), from base stations 105-a, 105-b, to facilitate idle state measurements or inactive state measurements. In some examples, UE 115-a may receive measurement configurations in various messages, for example, such as an RRC message or a SIB.

UE 115-a may experience challenges with timing information (e.g., a timing reference) between cells (e.g., serving cell 110-a, neighboring cell 110-b) during cell selection or cell reselection. For example, UE 115-a may receive a measurement configuration in a message, for example, such as an RRC message that may include information (e.g., SMTC information) relating to serving cell 110-a. UE 115-a may, however, move to other cells, for example, neighboring cell 110-b, which may not be in sync with serving cell 110-a. As a result, UE 115-a may experience problems (e.g., reduced coverage, higher latency, and the like) relating to CA and handover determinations due to unsuitable timing information. As demand for communication efficiency and improvements to wireless communication system 200 increases, improved techniques for enabling UE 115-a to determine or acquire suitable timing information (e.g., SMTC information) are desired.

According to an example, base stations 105-a, 105-b may transmit SSB measurement configurations in message 205, which UE 115-a may receive and use to perform idle state measurements or inactive state measurements for cell selection or cell reselection. In some examples, message 205 may be a SIB (e.g., an LTE/NR SIB). Base stations 105-a, 105-b may exclusively include SSB measurement configurations in message 205 (e.g., an LTE/NR SIB). In some examples, base stations 105-a, 105-b may transmit an SSB frequency list in message 205 or message 210, which UE 115-a may receive and use to perform idle state measurements or inactive state measurements for cell selection or cell reselection. The SSB frequency list may include a set of SSB frequencies, which may be inter-frequencies or intra-frequencies. In some examples, message 210) may be different from message 205. For example, message 210 may be an RRC message, such as an RRC connection release message while message 205 may be a SIB.

UE 115-*a* may override information relating to idle state measurements or inactive state measurements, for example, due to a difference between information included in messages 205, 210. By way of example, an SSB frequency list provided in message 205 may be different from an SSB frequency list provided in message 210. UE 115-*a* may, therefore, override the SSB frequency list indicated in message 205 or message 210. For example, UE 115-*a* may override an SSB frequency list indicated in a SIB and use an SSB frequency list indicated in an RRC release message. Alternatively, UE 115-*a* may compare SSB frequency lists associated with messages 205, 210 and use common SSB frequencies in SSB frequency lists included in messages 205, 210. In both examples, UE 115-*a* may use the SSB measurement configuration provided in message 205 (e.g., an NR/LTE SIB).

SSB measurement configurations relating to SSB frequencies in a sync raster for cell selection or cell reselection may correspond to a configured message format. The message format may be an NR format or a legacy-based format. Base stations 105-*a*, 105-*b* may configure a message format for SSB measurement configurations relating to SSB frequencies in a sync raster for cell selection or cell reselection. For example, base stations 105-*a*, 105-*b* may include SSB measurement configurations relating to SSB frequencies in a sync raster in an NR SIB (e.g., an NR SIB2/4), a new NR SIB type, or a legacy-based SIB (e.g., a SIB5, a SIB24, or the like). For each SSB frequency, SSB measurement configuration may include a set of information including: SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), or a combination thereof. UE 115-*a* may use the information to facilitate CA and handover determinations, among other procedures.

Similarly, in some examples, SSB measurement configurations relating to SSB frequencies not for cell selection or cell reselection (e.g., out of sync raster) may correspond to a configured message format. The message format may be an NR format or a legacy-based format. Base stations 105-*a*, 105-*b* may configure a message SSB measurement configurations relating to SSB frequencies out of a sync raster. For example, base stations 105-*a*, 105-*b* may include SSB measurement configurations relating to SSB frequencies out of a sync raster in an NR SIB (e.g., an NR SIB2), a new NR SIB type, or a legacy-based SIB (e.g., an LTE SIB5, an LTE SIB24, or the like). Thus, SSB frequencies for idle state measurements (or inactive state measurements) in or out of a sync raster may be included in an RRC release message (e.g. an LTE/NR RRC release message) or a SIB (e.g., an NR SIB2, a new NR SIB, an LTE SIB5, an LTE SIB24, or the like). Additionally, base station 105-*a* (e.g., a primary cell) of a master node may provide an LTE or an NR RRC release message including a list of SSB frequencies in or out of a sync raster for idle state measurement to UE 115-*a*. In some examples, SSB frequencies in a list of SSB frequencies provided in an RRC release message may vary from SSB frequencies delivered in a SIB.

UE 115-*a* behavior relating to obtaining measurement configurations associated with SSB frequencies may differ depending on whether the SSB frequencies are for cell reselection in a sync raster or not for cell reselection (e.g., out of a sync raster). For example, UE 115-*a* may receive an RRC message such as an RRC release message including measurement configurations for idle state measurement (e.g., NR early measurement configuration), and UE 115-*a* may obtain a list of SSB frequencies and a corresponding list of cells in the RRC release message. In some examples, for SSB frequencies in a sync raster, UE 115-*a* may obtain corresponding measurement configurations in an NR SIB (e.g., an NR SIB2/4) or a legacy-based SIB (e.g., an LTE SIB24) from base stations 105-*a*, 105-*b*. In some examples, for SSB frequencies out of a sync raster, UE 115-*a* may obtain corresponding measurement configurations in a same or different SIB type. That is, UE 115-*a* may obtain corresponding measurement configurations in an NR SIB (e.g., a NR SIB2, a new NR SIB type) or a legacy-based SIB (e.g., an LTE SIB5, an LTE SIB24, or the like) from base stations 105-*a*, 105-*b* for SSB frequencies that are out of a sync raster.

Alternatively, UE 115-*a* may obtain a list of SSB frequencies and a corresponding list of cells associated with the list of SSB frequencies for idle state measurement (e.g., NR early measurement configuration) in a configured SIB, such as an NR SIB (e.g., an NR SIB2) or legacy-based SIB (e.g., an LTE SIB5). Here, for SSB frequencies in a sync raster, UE 115-*a* may obtain corresponding measurement configurations in an NR SIB (e.g., an NR SIB2/4) or a legacy-based SIB (e.g., an LTE SIB24) from base stations 105-*a*, 105-*b*. Additionally, for SSB frequencies out of a sync raster, UE 115-*a* may obtain corresponding measurement configurations in a similar or different NR SIB (e.g., a NR SIB2, a new NR SIB type) or a legacy-based SIB (e.g., an LTE SIB5, an LTE SIB24, or the like) from base stations 105-*a*. 105-*b*.

UE 115-*a* may, therefore, perform idle state measurement for frequencies in a configured frequency list based on UE 115-*a* supporting CA or multi-radio access technology (MR) dual connectivity (DC) (MR-DC) between a frequency (e.g., associated with base station 105-*b*) in the list and a serving frequency (e.g., associated with base station 105-*a*). UE 115-*a* may, in some examples, refrain from idle state measurement (e.g., NR early measurement) on an SSB frequency. For example, if an NR SSB frequency for an idle state measurement has no corresponding measurement configuration in an LTE SIB or an NR SIB, UE 115-*a* may not perform early measurement on the SSB frequency.

According to another example, base stations 105-*a*, 105-*b* may alternatively transmit both SSB measurement configurations and SSB frequency lists in messages 205, 210, which UE 115-*a* may receive and use to perform idle state measurements or inactive state measurements. In some examples, message 205 may be a SIB (e.g., an LTE/NR SIB) while message 210 may be an RRC message (e.g., an RRC release message), or vice-versa. Similarly, UE 115-*a* may override information relating to idle state measurements or inactive state measurements, for example, due to a difference between information included in messages 205, 210.

By way of example, an SSB measurement configuration or an SSB frequency list provided in message 205 may be different from an SSB measurement configuration or an SSB frequency list provided in message 210. UE 115-*a* may override the SSB measurement configuration or the SSB frequency list indicated in message 205 or message 210. For example, UE 115-*a* may override an SSB measurement configuration or an SSB frequency indicated in a SIB (e.g., message 205) and use an SSB measurement configuration or an SSB frequency list indicated in an RRC release message (e.g. message 210). Alternatively, UE 115-*a* may compare SSB measurement configurations or SSB frequency lists associated with messages 205, 210 and use common SSB measurement configurations or SSB frequencies associated with messages 205, 210 for idle state measurements or inactive state measurements.

When performing cell reselection, UE 115-a may acquire SMTC information of a target cell in a SIB from the target cell (e.g., base station 105-b). UE 115-a may thereby replace previously received SMTC information indicated in an RRC message from a serving cell (e.g., base station 105-a). Alternatively, in some examples, UE 115-a may identify an indication in an RRC message (e.g., an RRC release message) defining whether UE 115-a may use SMTC information indicated in an RRC release message (e.g., configuration of validity area) during the cell reselection. As a result, UE 115-a may be capable of using appropriate timing information (e.g., a timing reference) for cell selection or cell reselection due to cell changes (e.g., UE 115-a roaming across cells).

Base stations 105-a, 105-b may configure a message format to include SSB measurement configurations relating to SSB frequencies in a sync raster for cell selection or cell reselection. The message format may be an NR format or a legacy-based format. For example, base stations 105-a, 105-b may include SSB measurement configurations relating to SSB frequencies in a sync raster for cell selection or cell reselection in a configured NR SIB (e.g., an NR SIB2/4), a new NR SIB type, or an LTE SIB (e.g., an SIB24, or the like). Similarly, in some examples, base stations 105-a, 105-b may exclusively include SSB measurement configurations relating to SSB frequencies that are out of a sync raster not for cell reselection in a same or different configured message format. For example, base stations 105-a, 105-b may include SSB measurement configurations relating to SSB frequencies out of a sync raster in a configured NR SIB (e.g., an NR SIB2), a new NR SIB type, or an LTE SIB (e.g., an LTE SIB5, an LTE SIB24, or the like). Thus, base stations 105-a, 105-b may transmit, and UE 115-a may receive a list of SSB frequencies with SSB frequencies in or out of a sync raster for idle state measurements or inactive state measurements in an RRC message (e.g., an LTE/NR RRC release message) or a SIB (e.g., an NR SIB2, a new NR SIB type, an LTE SIB5, an LTE SIB24, or the like).

UE 115-a behavior relating to obtaining measurement configurations associated with SSB frequencies may vary depending on whether UE 115-a performs cell reselection. When UE 115-a is not performing cell reselection, UE 115-a may receive measurement configurations for idle state measurements or inactive state measurements in an RRC message (e.g., an LTE/NR RRC message). Here, UE 115-a may obtain a list of SSB frequencies and corresponding cell lists, along with SSB measurement configurations in the RRC message. Otherwise, UE may obtain a list of SSB frequencies and corresponding cells lists for idle state measurements or inactive state measurements (e.g. early NR measurements) in a specific NR SIB or legacy-based SIB. For example, for SSB frequencies in a sync raster, UE 115-a may obtain corresponding SSB measurement configurations in an NR SIB (e.g., NR SIB2/4) or a legacy-based SIB (e.g., a SIB 24, or the like). Alternatively, for SSB frequencies out of a sync raster, UE 115-a may obtain corresponding SSB measurement configurations in a different NR SIB (e.g., NR SIB2) or a legacy-based SIB (e.g., a SIB5, a SIB 24, or the like).

In an example when UE 115-a is performing cell reselection, UE may obtain SMTC information of a target cell in a SIB from the target cell (e.g., base station 105-b). UE 115-a may thereby replace earlier received SMTC information indicated in an RRC release message from a serving cell (e.g., base station 105-a). Alternatively, in some examples, UE 115-a may identify an indication in an RRC message (e.g., an RRC release message) indicating whether UE 115-a may use the earlier SMTC information during the cell reselection. As a result, UE 115-a may update SMTC information and use appropriate timing information (e.g., a timing reference) for cell selection or cell reselection.

According to an alternative example, base stations 105-a, 105-b may transmit SSB frequency lists in messages 205, 210, which UE 115-a may receive and use to perform idle state measurements or inactive state measurements for cell selection or cell reselection. In some examples, message 205 may be a SIB (e.g., an LTE/NR SIB) while message 210 may be an RRC message (e.g., an RRC release message), or vice-versa. Base stations 105-a, 105-b may exclusively transmit measurements configurations for SSB frequencies out of a sync raster in message 210. That is, base stations 105-a, 105-b may transmit measurements configurations for SSB frequencies out of a sync raster in an RRC release message. UE 115-a may thereof obtain measurement configurations for SSB frequencies in a sync raster from message 205. That is, UE 115-a may obtain measurement configurations for SSB frequencies in a sync raster via a SIB (e.g., an LTE/NR SIB) from base stations 105-a, 105-b, and may obtain measurement configurations for SSB frequencies out of the sync raster from via an RRC release message from base stations 105-a, 105-b.

In some examples, UE 115-a may update information relating to idle state measurements or inactive state measurements, for example, due to a difference between information included in messages 205, 210. For example, UE 115-a may determine a difference between an SSB frequency list provided in an RRC release message and an SSB frequency list provide in a SIB. UE 115-a may override an SSB frequency list indicated in a SIB (e.g., message 205) and use an SSB frequency list indicated in an RRC release message (e.g. message 210). Alternatively, UE 115-a may compare SSB frequency lists associated with messages 205, 210 and use common SSB frequencies associated with messages 205, 210 for idle state measurements or inactive state measurements.

UE 115 may obtain measurement configurations of SSB frequencies for cell selection or cell reselection including SSB frequencies in a sync raster via a configured message format. For example, base stations 105-a, 105-b may transmit measurement configurations of SSB frequencies for cell selection or cell reselection with SSB frequencies in a sync raster via an NR SIB (e.g., an NR SIB2/4) or a legacy-based SIB (e.g., an LTE SIB24). In some examples, UE 115 may obtain measurement configurations of SSB frequencies for idle state measurements including SSB frequencies out of a sync raster via a different configured message format. For example, base stations 105-a, 105-b may transmit measurement configurations of SSB frequencies for idle state measurements including SSB frequencies out of a sync raster in an RRC release message. UE 115-a may therefore obtain measurement configuration for SSB frequencies in a sync raster via a configured SIB (e.g., an LTE/NR SIB) and measurement configuration for SSB frequencies out of sync raster from an RRC release message.

In some examples, base stations 105-a, 105-b may indicate in an RRC release message whether UE 115-a may continue to use SMTC information during cell selection or cell reselection. In some examples, if the SMTC is for an SSB frequency in a sync raster, UE 115-a may reacquire SMTC information via a SIB from a target cell when the SMTC information in an RRC release message is indicating for UE 115-*a* not to use the SMTC information during cell reselection. Alternatively, if the SMTC information for an SSB frequency is out of a sync raster, UE 115-*a* may not perform a corresponding measurement if the SMTC information in an RRC release message is indicating for UE 115-*a* not to use the SMTC information during cell reselection. In some examples, the base stations 105-*a*, 105-*b* may transmit RRC release message exclusively when the wireless communications system 200 (e.g., network) is synchronized. Then, UE 115-*a* may continue to use SMTC information indicated in an RRC release message during cell reselection. In some examples, base stations 105-*a*, 105-*b* may indicate in an RRC release message the SSB frequencies for early measurement configurations including those on sync raster and non-sync raster. And UE 115-*a* may override those on sync raster indicated by legacy SIBs including only the frequencies on sync raster that are candidate for cell reselection.

After performing idle state measurements or inactive state measurements, UE 115-*a* may transmit a measurement report to base stations 105-*a*, 105-*b* that includes measurements for synchronization signals or reference signals from corresponding base stations 105-*a*, 105-*b*. In some examples, based on measurement information in the measurement report, base station 105-*a* may determine to pass on UE 115-*a* to base station 105-*b*. For example, measurements of synchronization signals or reference signals may indicate that base station 105-*b* has a better connection with UE 115-*a*, and base station 105-*a* may handover communications with UE 115-*a* to base station 105-*b*. Additionally or alternatively, UE 115-*a* may move from a coverage area associated with base station 105-*a* to a coverage area associated with base station 105-*b*, and base station 105-*a* may use the measurements in the measurement report to perform a handover to base station 105-*b*. Accordingly, measurement report may include measurements for different SSB frequencies to facilitate movement of UE 115-*a* from cell to cell (e.g., from base station to base station, from radio access technology to radio access technology, etc.)

The wireless communications system 200 may therefore realize one or more advantages. The described techniques in the wireless communications system 200 may support improvements in power savings, among other advantages. As such, supported techniques may include improved UE 115-*a* operations and, in some examples, may promote UE 115-*a* efficiencies, UE 115-*a* coverage, among other benefits. For example, UE 115-*a* may experience reduced overhead signaling for idle state measurements and inactive state measurements.

Figure 3:
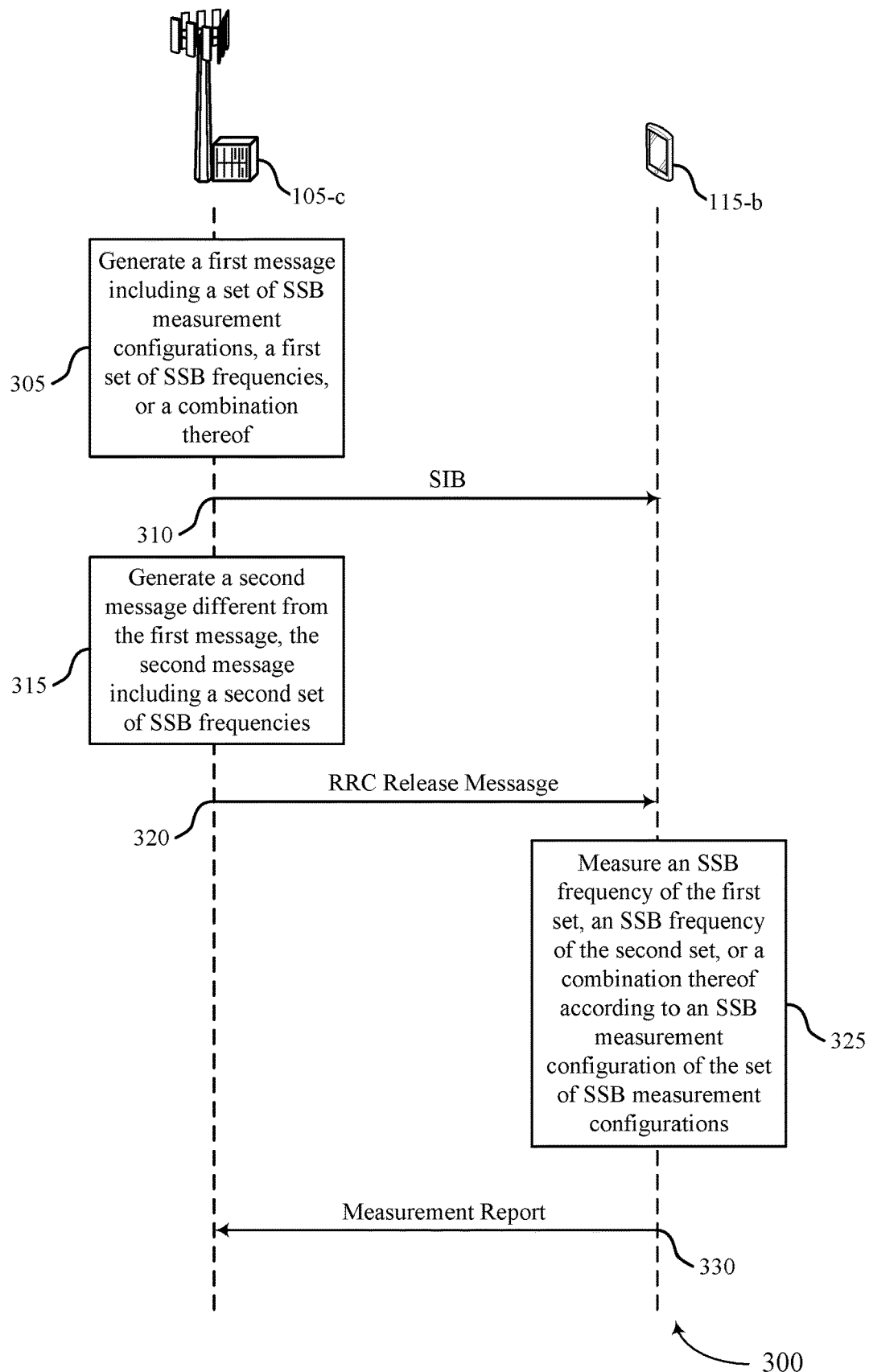
FIGS. 3 through 5 illustrate example of a process flow that supports NR SSB related idle measurement configuration in accordance with aspects of the present disclosure.

FIG. 3 illustrates an example of a process flow 300 that supports NR SSB related idle measurement configuration in accordance with aspects of the present disclosure. The process flow 300 may implement aspects of wireless communications systems 100 and 200, as described with reference to FIGS. 1 and 2. For example, the process flow 300 may be based on a configuration by base station 105-*c*, and implemented by UE 115-*b* for providing improvements to idle state measurements or inactive state measurements, among other advantages. For example, the process flow 300 may enable the base station 105-*c* to transmit and the UE 115-*b* to receive SSB related measurement configurations exclusively in a SIB. The process flow 300 may also enable the base station 105-*c* to transmit and the UE 115-*b* to receive one or more SSB frequency lists for idle measurements in either or both a SIB or an RRC message, such as an RRC release message. In the following description of the process flow 300, the operations between the base station 105-*c* and the UE 115-*b* may be transmitted in a different order than the example order shown, or the operations performed by the base station 105-*c* and the UE 115-*b* may be performed in different orders or at different times. Some operations may also be omitted from the process flow 300, and other operations may be added to the process flow 300.

At 305, the base station 105-*c* may generate a first message including a set of SSB measurement configurations, a first set of SSB frequencies, or a combination thereof. In some examples, the first message may be a SIB, as described herein. At 310, the base station 105-*c* may transmit, to the UE 115-*b*, a SIB that may include the set of SSB measurement configurations, the first set of SSB frequencies, or a combination thereof. The first message may, in some examples, include a first format based on a presence of an SSB frequency of the first set in a sync raster, the set of SSB measurement configurations relating to a cell selection by the UE 115-*b* or a cell reselection by the UE 115-*b*. The first format may include an NR SIB or a legacy-based SIB. Thus, the UE 115-*b* may receive the set of SSB measurement configurations in the NR SIB or the legacy-based SIB based on the presence of the SSB frequency of the first set in the sync raster.

Alternatively, the first message may include a second format based on an absence of the SSSB frequency of the first set in the sync raster, the set of SSB measurement configurations, or a combination thereof relating to one or more of an idle state measurement by the UE 115-*b* or an inactive state measurement by the UE 115-*b*. The second format may include an NR SIB or a legacy-based SIB. Thus, in some examples, the UE 115-*b* may receive the set of SSB measurement configurations in the NR SIB or the legacy-based SIB based on the absence of the SSB frequency of the first set in the sync raster. At 315, the base station 105-*c* may generate a second message different from the first message, the second message including a second set of SSB frequencies. In some examples, the second message may be an RRC message, such as an RRC release message. At 320, the base station 105-*c* may transmit, to the UE 115-*b*, an RRC release message that may include the second set of SSB frequencies.

At 325, the UE 115-*b* may measure an SSB frequency of the first set, an SSB frequency of the second set, or a combination thereof according to an SSB measurement configuration of the set of SSB measurement configurations. In some examples, the UE 115-*b* may measure, while in an idle mode or an inactive mode, the SSB frequency of the first set, or the SSB frequency of the second set, or a combination thereof according to the SSB measurements configuration of the set of SSB measurement configurations. At 330, the UE 115-*b* may transmit a measurement report to the base station 105-*c* for cell selection or cell reselection determinations, as described herein.

Figure 4:
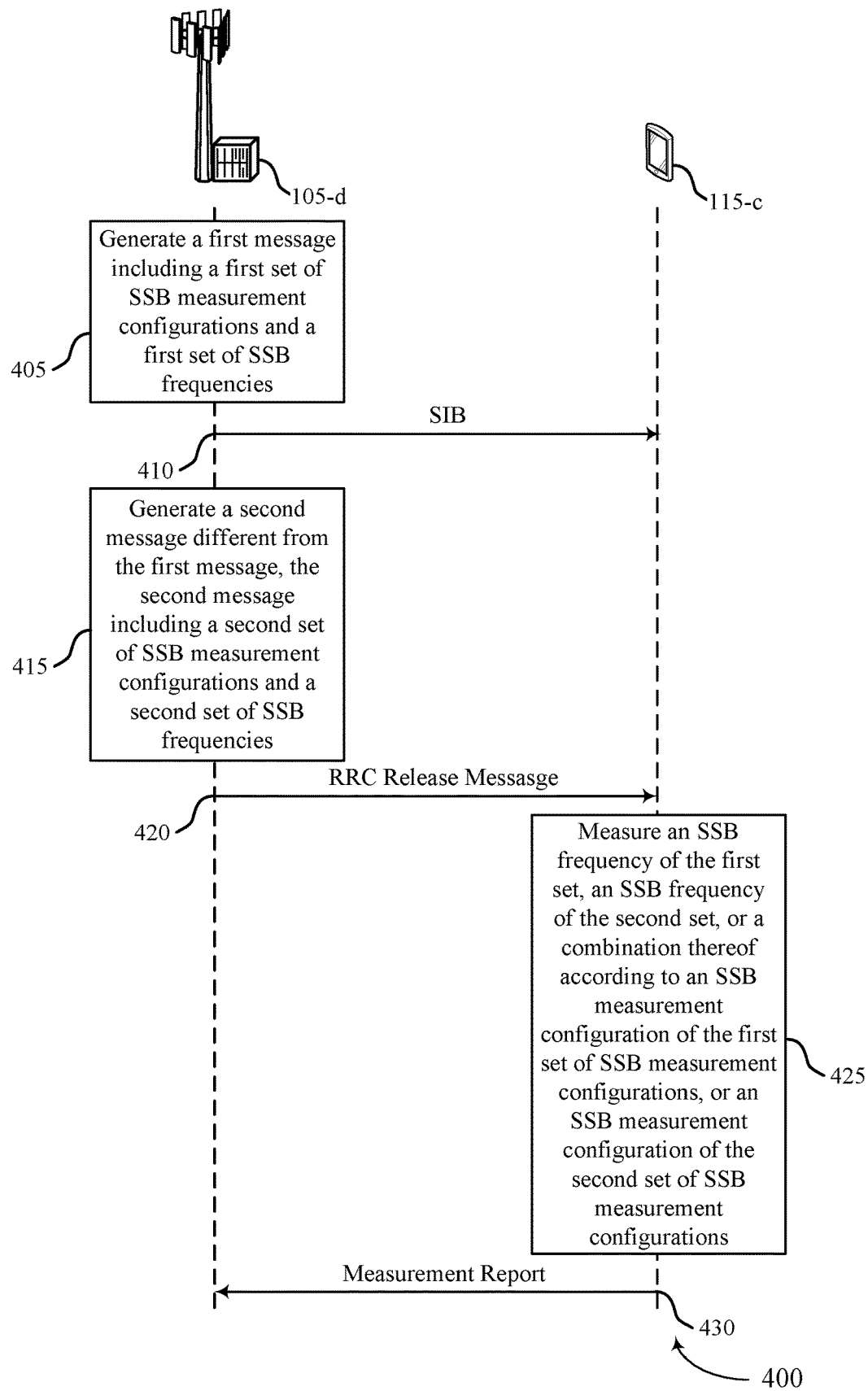

FIG. 4 illustrates an example of a process flow 400 that supports NR SSB related idle measurement configuration in accordance with aspects of the present disclosure. The process flow 400 may implement aspects of wireless communications systems 100 and 200, as described with reference to FIGS. 1 and 2. For example, the process flow 400 may be based on a configuration by base station 105-*d*, and implemented by UE 115-*c* for providing improvements to idle state measurements or inactive state measurements, among other advantages. For example, the process flow 400 may enable the base station 105-*d* to transmit and the UE 115-*c* to receive both SSB related measurement configurations and SSB frequency lists for idle measurements in a SIB and an RRC message. In the following description of the process flow 400, the operations between the base station 105-d and the UE 115-c may be transmitted in a different order than the example order shown, or the operations performed by the base station 105-d and the UE 115-c may be performed in different orders or at different times. Some operations may also be omitted from the process flow 400, and other operations may be added to the process flow 400.

At 405, the base station 105-d may generate a first message including a set of SSB measurement configurations and a first set of SSB frequencies. In some examples, the first message may be a SIB, as described herein. At 410), the base station 105-c may transmit, to the UE 115-c, a SIB that may include the set of SSB measurement configurations and the first set of SSB frequencies. The first message may, in some examples, include a first format based on a presence of an SSB frequency of the first set in a sync raster, the set of SSB measurement configurations relating to a cell selection by the UE 115-c or a cell reselection by the UE 115-c. The first format may include an NR SIB or a legacy-based SIB. Thus, the UE 115-c may receive the set of SSB measurement configurations in the NR SIB or the legacy-based SIB based on the presence of the SSB frequency of the first set in the sync raster. Alternatively, the first message may include a second format based on an absence of the SSB frequency of the first set in the sync raster, the set of SSB measurement configurations, or a combination thereof relating to one or more of an idle state measurement by the UE 115-c or an inactive state measurement by the UE 115-c. The second format may include an NR SIB or a legacy-based SIB. Thus, in some examples, the UE 115-c may receive the set of SSB measurement configurations in the NR SIB or the legacy-based SIB based on the absence of the SSB frequency of the first set in the sync raster.

At 415, the base station 105-c may generate a second message different from the first message, the second message including a second set of SSB measurement configurations and a second set of SSB frequencies. In some examples, the second message may be an RRC message, such as an RRC release message. At 420, the base station 105-c may transmit, to the UE 115-c, an RRC release message that may include the second set of SSB measurement configurations and the second set of SSB frequencies. At 425, the UE 115-c may measure an SSB frequency of the first set, an SSB frequency of the second set, or a combination thereof according to an SSB measurement configuration of the first set of SSB measurement configurations, or an SSB measurement configuration of the second set of SSB measurement configurations. The UE 115-c may measure, while in an idle mode or an inactive mode, the SSB frequency of the first set, or the SSB frequency of the second set, or a combination thereof according to the SSB measurements configuration of the first set and the second set of SSB measurement configurations. At 430, the UE 115-c may transmit a measurement report to the base station 105-d for cell selection or cell reselection determinations, as described herein.

Figure 5:
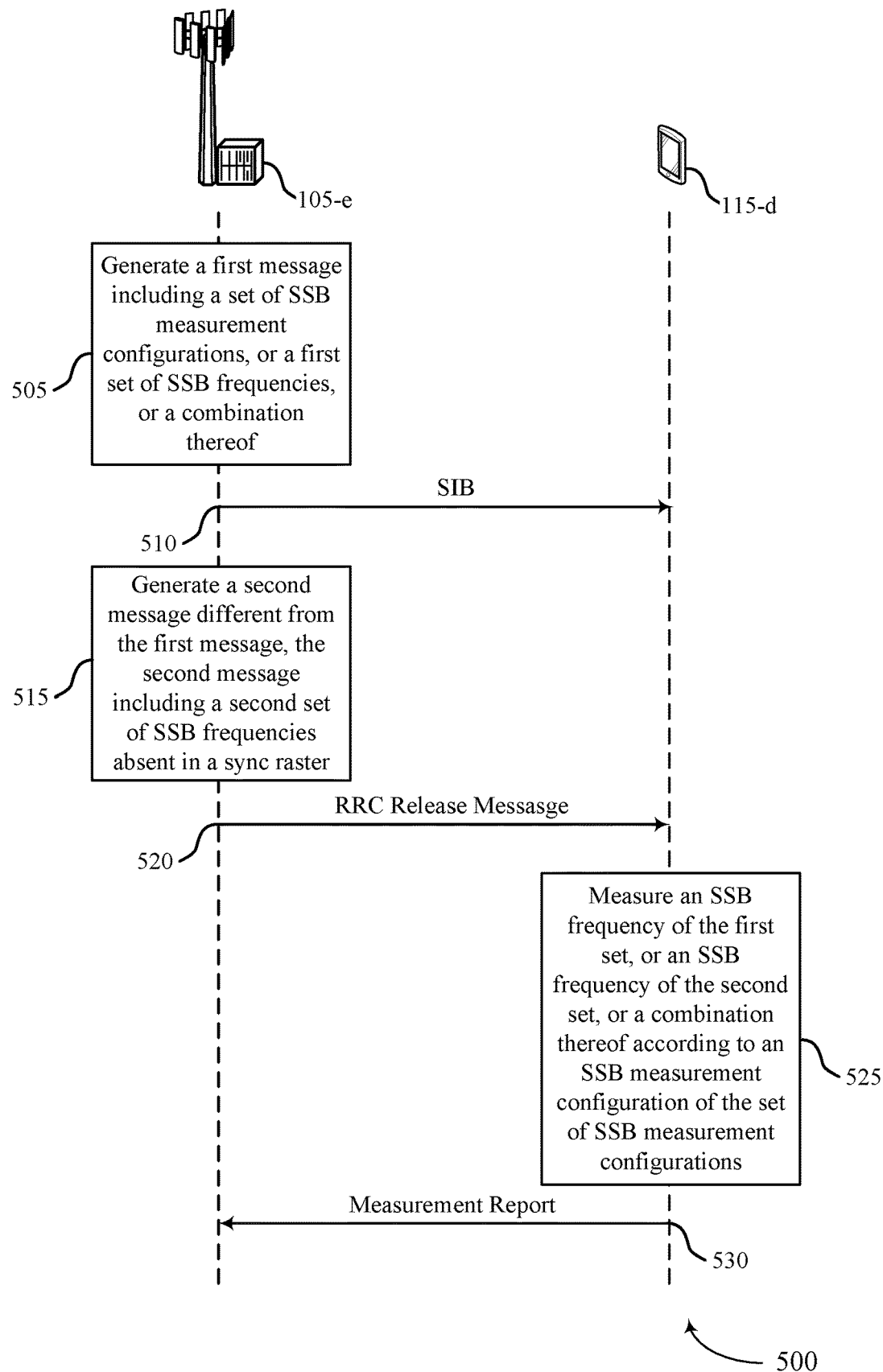

FIG. 5 illustrates an example of a process flow 500 that supports NR SSB related idle measurement configuration in accordance with aspects of the present disclosure. The process flow 500 may implement aspects of wireless communications systems 100 and 200, as described with reference to FIGS. 1 and 2. For example, the process flow 500 may be based on a configuration by base station 105-e, and implemented by UE 115-d for providing improvements to idle state measurements or inactive state measurements, among other advantages. For example, the process flow 500 may enable the base station 105-e to transmit and the UE 115-d to receive SSB frequency lists in a SIB and an RRC message, while SSB measurement configurations for SSB frequencies out of a sync raster may exclusively be indicated in the RRC message. In the following description of the process flow 500, the operations between the base station 105-e and the UE 115-d may be transmitted in a different order than the example order shown, or the operations performed by the base station 105-e and the UE 115-d may be performed in different orders or at different times. Some operations may also be omitted from the process flow 500, and other operations may be added to the process flow 500.

At 505, the base station 105-e may generate a first message including a set of SSB measurement configurations, or a first set of SSB frequencies, or a combination thereof. In some examples, the first message may be a SIB, as described herein. At 510, the base station 105-e may transmit, to the UE 115-d, a SIB that may include the set of SSB measurement configurations, or the first set of SSB frequencies, or a combination thereof. The first message may have a configured format, for example, such as an NR SIB or a legacy-based SIB. At 515, the base station 105-e may generate a second message different from the first message, the second message including a second set of SSB frequencies out of a sync raster. In some examples, the second message may be an RRC message, such as an RRC release message. At 520, the base station 105-e may transmit, to the UE 115-d, an RRC release message that may include the second set of SSB frequencies that are out of the sync raster.

At 525, the UE 115-d may measure an SSB frequency of the first set, an SSB frequency of the second set, or a combination thereof according to an SSB measurement configuration of the set of SSB measurement configurations. The UE 115-d may measure, while in an idle mode or an inactive mode, the SSB frequency of the first set, or the SSB frequency of the second set, or a combination thereof according to the SSB measurement configurations. At 530, the UE 115-d may transmit a measurement report to the base station 105-e for cell selection or cell reselection determinations, as described herein.

Figure 6:
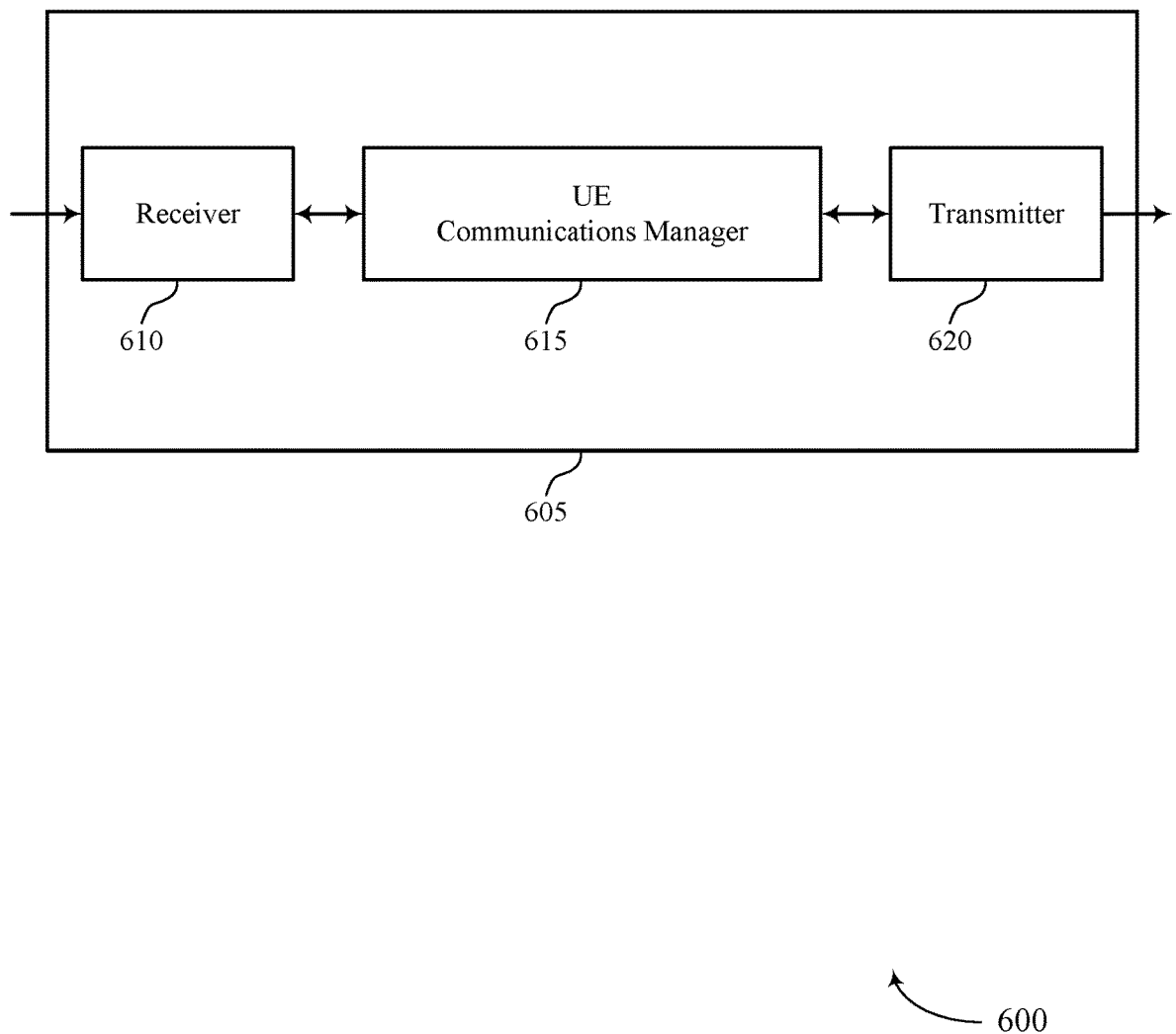
FIGS. 6 and 7 show block diagrams of devices that support NR SSB related idle measurement configuration in accordance with aspects of the present disclosure.

FIG. 6 shows a block diagram 600 of a device 605 that supports NR SSB related idle measurement configuration in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to NR SSB related idle measurement configuration, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a first message including a set of SSB measurement configurations, a first set of SSB frequencies, or a combination thereof, receive a second message different from the first message, the second message including a second set of SSB frequencies, measure a SSB frequency of the first set, a SSB frequency of the second set, or a combination thereof, where the measuring may be according to a SSB measurement configuration of the set of SSB measurement configurations, and transmit a measurement report based on the measuring.

The UE communications manager 615 may also receive a first message including a first set of SSB measurement configurations and a first set of SSB frequencies, receive a second message different from the first message, the second message including a second set of SSB measurement configurations and a second set of SSB frequencies, measure a SSB frequency of the first set of SSB frequencies, or a SSB frequency of the second set of SSB frequencies, or a combination thereof, where the measuring may be according to a SSB measurement configuration of the first set of SSB measurement configurations, or a SSB measurement configuration of the second set of SSB measurement configurations, or a combination thereof, and transmit a measurement report based on the measuring.

The UE communications manager 615 may also receive a first message including a set of SSB measurement configurations, or a first set of SSB frequencies, or a combination thereof, receive a second message including a second set of SSB frequencies absent in a sync raster, measure a SSB frequency of the first set, or a SSB frequency of the second set, or a combination thereof, where the measuring is according to a SSB measurement configuration of the set of SSB measurement configurations, and transmit a measurement report based on the measuring. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
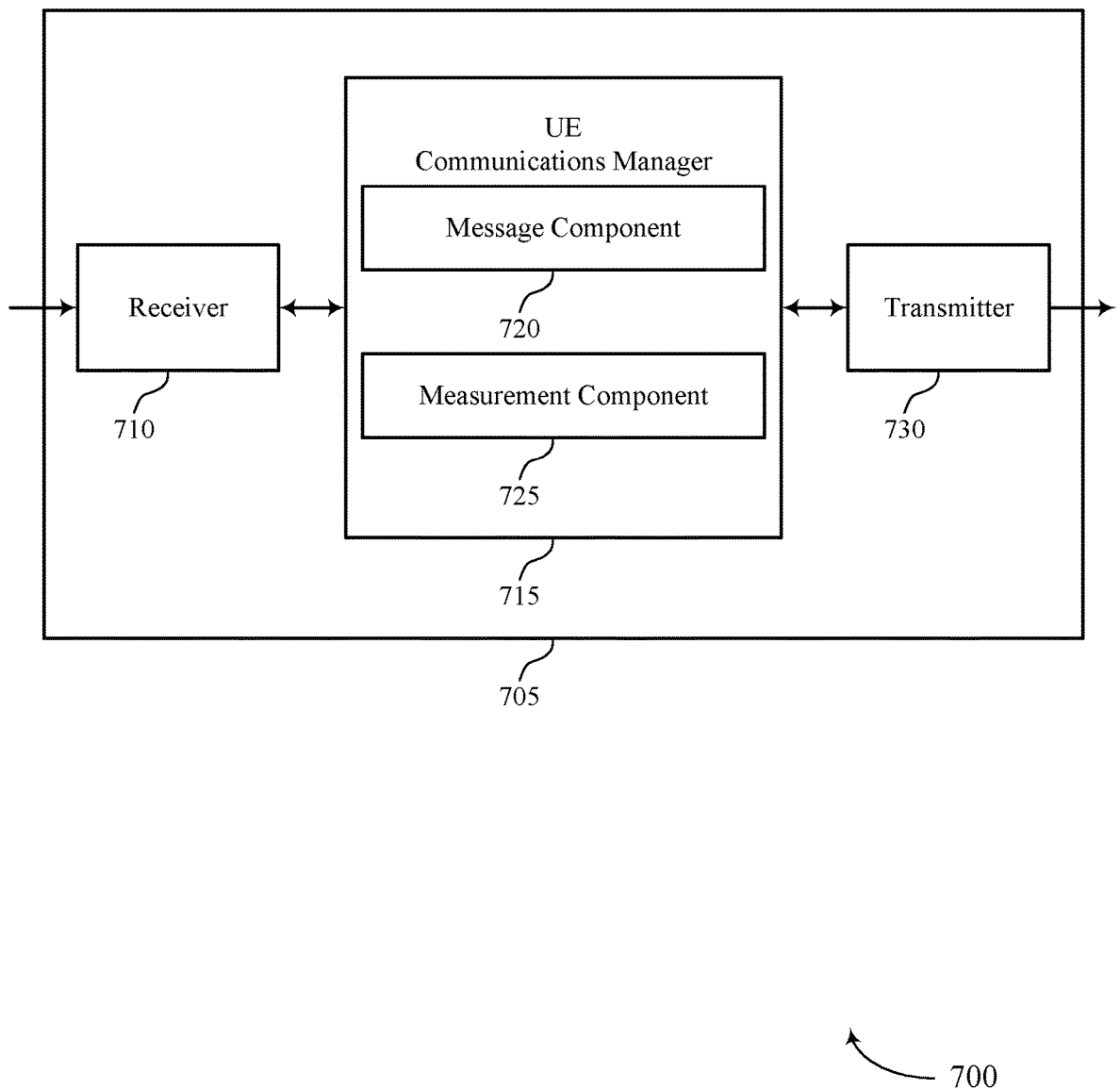

FIG. 7 shows a block diagram 700 of a device 705 that supports NR SSB related idle measurement configuration in accordance with aspects of the present disclosure. The device 705 may be an example of aspects of a device 605, or a UE 115 as described herein. The device 705 may include a receiver 710, a UE communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to NR SSB related idle measurement configuration, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a message component 720 and a measurement component 725. The UE communications manager 715 may be an example of aspects of the UE communications manager 910 described herein.

The message component 720 may receive a first message including a set of SSB measurement configurations, a first set of SSB frequencies, or a combination thereof and receive a second message different from the first message, the second message including a second set of SSB frequencies. The measurement component 725 may measure an SSB frequency of the first set, an SSB frequency of the second set, or a combination thereof, where the measuring may be according to an SSB measurement configuration of the set of SSB measurement configurations and transmit a measurement report based on the measuring.

The message component 720 may receive a first message including a first set of SSB measurement configurations and a first set of SSB frequencies and receive a second message different from the first message, the second message including a second set of SSB measurement configurations and a second set of SSB frequencies. The measurement component 725 may measure a SSB frequency of the first set of SSB frequencies, or a SSB frequency of the second set of SSB frequencies, or a combination thereof, where the measuring may be according to a SSB measurement configuration of the first set of SSB measurement configurations, or a SSB measurement configuration of the second set of SSB measurement configurations, or a combination thereof and transmit a measurement report based on the measuring.

The message component 720 may receive a first message including a set of SSB measurement configurations, or a first set of SSB frequencies, or a combination thereof and receive a second message including a second set of SSB frequencies absent in a sync raster. The measurement component 725 may measure an SSB frequency of the first set, or an SSB frequency of the second set, or a combination thereof, where the measuring may be according to an SSB measurement configuration of the set of SSB measurement configurations and transmit a measurement report based on the measuring.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
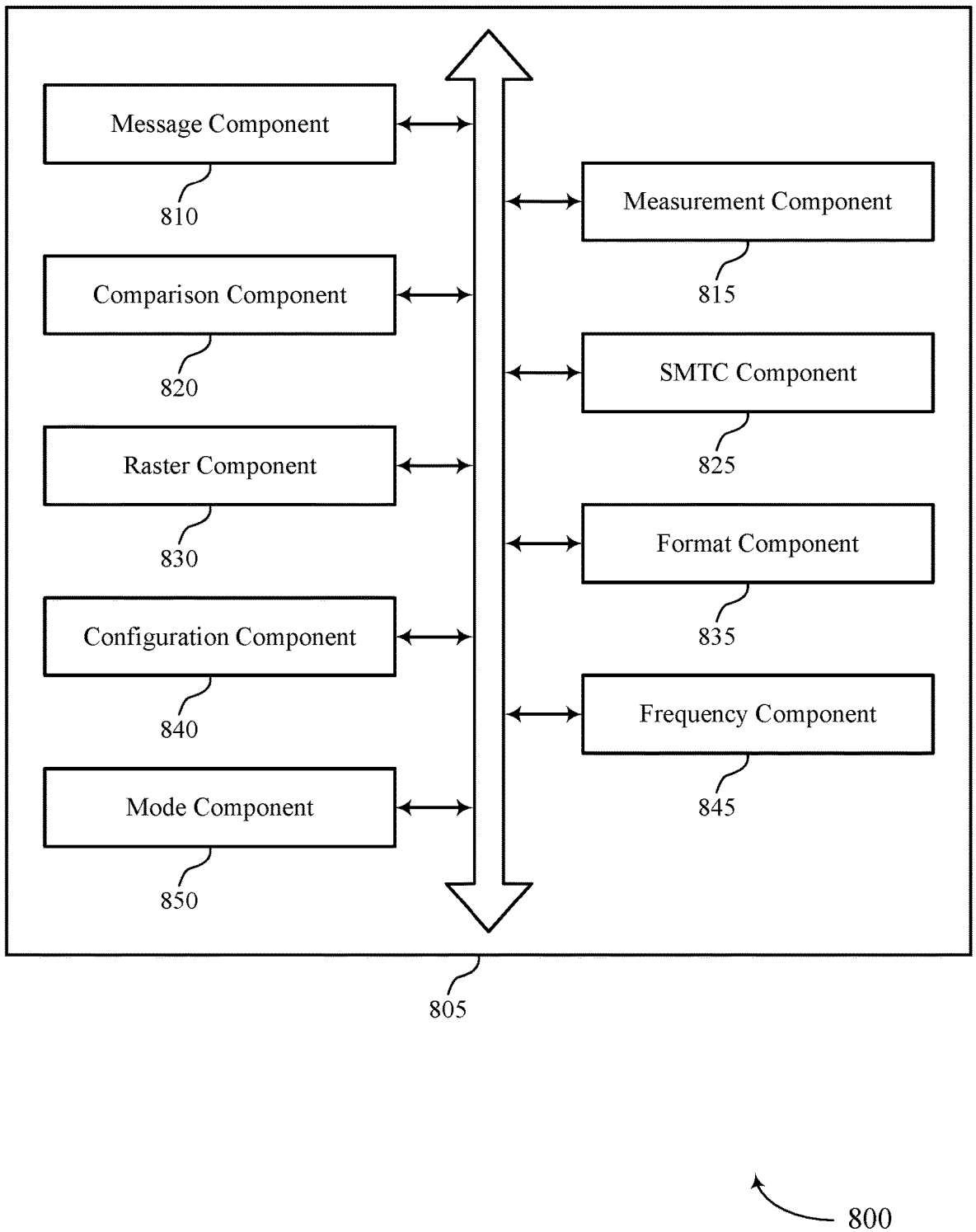
FIG. 8 shows a block diagram of a UE communications manager that supports NR SSB related idle measurement configuration in accordance with aspects of the present disclosure.

FIG. 8 shows a block diagram 800 of a UE communications manager 805 that supports NR SSB related idle measurement configuration in accordance with aspects of the present disclosure. The UE communications manager 805 may be an example of aspects of a UE communications manager 615, a UE communications manager 715, or a UE communications manager 910 described herein. The UE communications manager 805 may include a message component 810, a measurement component 815, a comparison component 820, a SMTC component 825, a raster component 830, a format component 835, a configuration component 840, a frequency component 845, and a mode component 850. Each of these modules may communicate, directly or indirectly, with one another (e.g., via one or more buses).

The message component 810 may receive a first message including a set of SSB measurement configurations, a first set of SSB frequencies, or a combination thereof. In some examples, the message component 810 may receive a second message different from the first message, the second message including a second set of SSB frequencies. In some examples, the message component 810 may receive a first message including a first set of SSB measurement configurations and a first set of SSB frequencies. In some examples, the message component 810 may receive a second message different from the first message, the second message including a second set of SSB measurement configurations and a second set of SSB frequencies. In some examples, the message component 810 may receive a first message including a set of SSB measurement configurations, or a first set of SSB frequencies, or a combination thereof. In some examples, the message component 810 may receive a second message including a second set of SSB frequencies absent in a sync raster.

In some examples, the message component 810 may receive a SIB including the set of SSB measurement configurations, or the first set of SSB frequencies, or a combination thereof. In some examples, the message component 810 may receive an RRC message including the second set of SSB frequencies. In some examples, the message component 810 may receive the first message, or the second message, or a combination thereof from a serving cell associated with the UE. In some examples, the message component 810 may receive a SIB including the first set of SSB measurement configurations or the first set of SSB frequencies, or a combination thereof. In some examples, the message component 810 may receive an RRC message including the second set of SSB measurement configurations or the second set of SSB frequencies. In some examples, the message component 810 may receive the second message from a serving cell associated with the UE. In some cases, the second message includes an RRC message including the indication. In some cases, the second message is different from the first message.

The measurement component 815 may measure an SSB frequency of the first set, an SSB frequency of the second set, or a combination thereof, where the measuring is according to an SSB measurement configuration of the set of SSB measurement configurations. In some examples, the measurement component 815 may transmit a measurement report based on the measuring. In some examples, the measurement component 815 may measure a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof. In some examples, the measurement component 815 may transmit a measurement report based on the measuring.

In some examples, the measurement component 815 may measure an SSB frequency of the first set, or an SSB frequency of the second set, or a combination thereof, where the measuring is according to an SSB measurement configuration of the set of SSB measurement configurations. In some examples, the measurement component 815 may transmit a measurement report based on the measuring. In some examples, measurement component 815 may ignore the first set based on the difference between the first set and the second set, where measuring the SSB frequency of the first set, the SSB frequency of the second set, or a combination thereof includes measuring the SSB frequency of the second set, and refraining from measuring the SSB frequency of the first set based on the ignoring. In some examples, the measurement component 815 may measure the SSB frequency of the first set, or the SSB frequency of the second set, or a combination thereof based on a CA capability or a multi-radio access technology dual-connectivity capability.

The comparison component 820 may determine a difference between the first set and the second set based on comparing SSB frequencies of the first set to SSB frequencies of the second set, where measuring the SSB frequency of the first set, the SSB frequency of the second set, or a combination thereof based on the difference between the first set and the second set. In some examples, the comparison component 820 may determine a subset of SSB frequencies based on comparing SSB frequencies of the first set to SSB frequencies of the second set, the subset of SSB frequencies including common SSB frequencies between the first set and the second set, and measure the common SSB frequencies, where the common SSB frequencies includes the SSB frequency of the first set and the SSB frequency of the second set.

In some examples, the comparison component 820) may determine an additional difference between the first set of SSB measurement configurations and the second set of SSB measurement configurations based on comparing SSB measurement configurations of the first set of SSB measurement configurations to SSB measurements configurations of the second set of SSB measurement configurations, where measuring the SSB frequency of the first set of SSB frequencies, or the SSB frequency of the second set of SSB frequencies, or a combination thereof based on one or more of the difference and the additional difference.

In some examples, the comparison component 820 may ignore the first set of SSB frequencies and the first set of SSB measurement configurations based on one or more of the difference and the additional difference, where measuring the SSB frequency of the first set of SSB frequencies, or the SSB frequency of the second set of SSB frequencies, or a combination thereof includes measuring the SSB frequency of the second set of SSB frequencies, and ignoring the SSB frequency of the first set of SSB frequencies. In some examples, the comparison component 820 may determine a subset of SSB frequencies based on comparing SSB frequencies of the first set of SSB frequencies to SSB frequencies of the second set of SSB frequencies, the subset of SSB frequencies including common SSB frequencies between the first set of SSB frequencies and the second set of SSB frequencies. In some examples, the comparison component 820 may determine a subset of SSB measurement configurations based on comparing measurement configurations of the first set of SSB measurement configurations to measurement configurations of the second set of SSB measurement configurations, the subset of SSB measurement configurations including common measurement configurations between the first set of SSB measurement configurations and the second set of SSB measurement configurations. In some examples, comparison component 820 may measure the common SSB frequencies according to the common measurement configurations, where the common SSB frequencies includes the SSB frequency of the first set of SSB frequencies and the SSB frequency of the second set of SSB frequencies.

The SMTC component 825 may identify a first SMTC associated with a serving cell based on the first message, or the second message, or a combination thereof. In some examples, the SMTC component 825 may identify a second SMTC associated with a target cell based on a third message, the third message including a SIB. In some examples, the SMTC component 825 may replace the first SMTC of the serving cell with the second SMTC associated with the target cell.

In some examples, the SMTC component 825 may identify a first SMTC associated with a serving cell based on the first message or the second message, or a combination thereof. In some examples, the SMTC component 825 may identify a second SMTC associated with a target cell based on a third message, the third message including a SIB. In some examples, the SMTC component 825 may replace the first SMTC of the serving cell with the second SMTC associated with the target cell. In some examples, the SMTC component 825 may determine whether a SMTC is valid during a cell reselection based on an indication. In some examples, the SMTC component 825 may determine that the SMTC relates to SSB frequencies of the first set of SSB frequencies present in the sync raster. In some examples, the SMTC component 825 may obtain, based on the SMTC being invalid, a second SMTC from a target cell according to a third message from the target cell, the third message including a SIB. In some examples, the SMTC component 825 may determine that the SMTC relates to SSB frequencies of the second set of SSB frequencies absent in the sync raster. In some examples, the SMTC component 825 may refrain from measuring the SSB frequencies of the second set of SSB frequencies based on the SMTC being invalid.

The raster component 830) may determine an absence of the SSB measurement configuration of the set of SSB measurement configurations associated with the SSB frequency of the first set, or the SSB frequency of the second set, or a combination thereof. In some examples, the raster component 830 may refrain from measuring one or more of the SSB frequency of the first set, or the SSB frequency of the second set, or a combination thereof based on the absence of the SSB measurement configuration. In some cases, the SSB frequency of the first set, or the SSB frequency of the second set, or a combination thereof are present in a sync raster or absent in the sync raster. In some cases, the SSB frequency of the first set, or the SSB frequency of the second set, or a combination therefore are present in the sync raster or absent in the sync raster. In some cases, the SSB frequency of the first set of SSB frequencies are present in a sync raster or absent in the sync raster. In some cases, the SSB frequency of the first set of SSB frequencies, or the SSB frequency of the second set of SSB frequencies, or a combination thereof are present in the sync raster or absent in the sync raster. In some cases, the SSB frequency of the first set of SSB frequencies are present in the sync raster or absent in the sync raster.

The format component 835 may receive the set of SSB measurement configurations in the NR SIB or the legacy-based SIB based on the presence of the SSB frequency of the first set in the sync raster. In some examples, the format component 835 may receive the set of SSB measurement configurations in the NR SIB or the legacy-based SIB based on the absence of the SSB frequency of the first set in the sync raster. In some examples, the format component 835 may receive the first set of SSB measurement configurations in the NR SIB or the legacy-based SIB based on the presence of the SSB frequency of the first set of SSB frequencies in the sync raster. In some examples, the format component 835 may receive the first set of SSB measurement configurations in the NR SIB or the legacy-based SIB based on the absence of the SSB frequency of the first set of SSB frequencies in the sync raster. In some cases, the first message includes a first format based on a presence of the SSB frequency of the first set in the sync raster, the set of SSB measurement configurations relating to a cell selection by the UE or a cell reselection by the UE. In some cases, the first format includes a NR SIB or a legacy-based SIB.

In some cases, the first message includes a second format based on an absence of the SSB frequency of the first set in the sync raster, the set of SSB measurement configurations, or a combination thereof relating to one or more of an idle state measurement by the UE or an inactive state measurement by the UE. In some cases, the second format includes a NR SIB or a legacy-based SIB. In some cases, the second format is different from the first format. In some cases, the first message includes a first format based on a presence of the SSB frequency of the first set of SSB frequencies in the sync raster, the first set of SSB measurement configurations, or a combination thereof relating to a cell selection by the UE or a cell reselection by the UE. In some cases, the first message includes a second format based on an absence of the SSB frequency of the first set of SSB frequencies in the sync raster, the first set of SSB measurement configurations, or a combination thereof relating to one or more of an idle state measurement by the UE or an inactive state measurement by the UE.

The configuration component 840 may identify that each SSB frequency of the first set or each SSB frequency of the second set correspond to SSB measurement configurations of the set of SSB measurement configurations. The configuration component 840 may identify that the SSB measurement configuration includes one or more of a SMTC, a subcarrier spacing, an SSB index, a radio frequency spectrum band index, a measurement-type, and a cell quantity configuration. In some cases, each SSB frequency of the first set or each SSB frequency of the second set correspond to SSB measurement configurations of the set of SSB measurement configurations. In some cases, the SSB measurement configuration includes one or more of a SMTC, a subcarrier spacing, an SSB index, a radio frequency spectrum band index, a measurement-type, and a cell quantity configuration.

The frequency component 845 may identify the second set of SSB frequencies, or a set of neighboring cells, or a combination thereof based on the second message, where the second set of SSB frequencies includes NR set of SSB frequencies. In some examples, the frequency component 845 may identify presence of one or more SSB frequencies of the NR set of SSB frequencies in a sync raster. In some examples, the frequency component 845 may identify one or more SSB measurement configurations associated with the one or more SSB frequencies of the NR set of SSB frequencies in the sync raster based on a NR SIB or a legacy-based SIB. In some examples, the frequency component 845 may measure the one or more SSB frequencies of the NR set of SSB frequencies according to the one or more SSB measurement configurations associated with the one or more SSB frequencies of the NR set of SSB frequencies in the sync raster. In some examples, the frequency component 845 may identify absence of one or more SSB frequencies of the NR set of SSB frequencies in a sync raster.

In some examples, the frequency component 845 may identify one or more SSB measurement configurations associated with the one or more SSB frequencies of the NR set of SSB frequencies based on a NR SIB or a legacy-based SIB. In some examples, the frequency component 845 may measure the one or more SSB frequencies of the NR set of SSB frequencies according to the one or more SSB measurement configurations associated with the one or more SSB frequencies of the NR set of SSB frequencies. In some examples, identifying the second set of SSB frequencies, or a set of neighboring cells, or a combination thereof based on the second message, where the second set of SSB frequencies includes NR set of SSB frequencies.

In some examples, the frequency component 845 may identify one or more measurement configurations associated with the one or more SSB frequencies of the NR set of SSB frequencies in the sync raster based on a NR SIB or a legacy-based SIB. In some examples, the frequency component 845 may measure the one or more SSB frequencies of the NR set of SSB frequencies according to the one or more measurement configurations associated with the one or more SSB frequencies of the NR set of SSB frequencies in the sync raster. In some examples, the frequency component 845 may determine an absence of a measurement configuration of the first set of SSB measurement configurations associated with the SSB frequency of the first set of SSB frequencies, or the second set of SSB measurement configurations associated with the SSB frequency of the second set of SSB frequencies, or a combination thereof. In some examples, the frequency component 845 may refrain from measuring the SSB frequency of the first set of SSB frequencies, or the SSB frequency of the second set of SSB frequencies, or a combination thereof based on the absence.

The mode component 850 may identify a RRC mode, where the RRC mode includes an idle mode or an inactive mode, where measuring the SSB frequency of the first set, or the SSB frequency of the second set, or a combination thereof includes measuring, while in the idle mode or the inactive mode, the SSB frequency of the first set, or the SSB frequency of the second set, or a combination thereof according to the SSB measurements configuration of the set of SSB measurement configurations.

Figure 9:
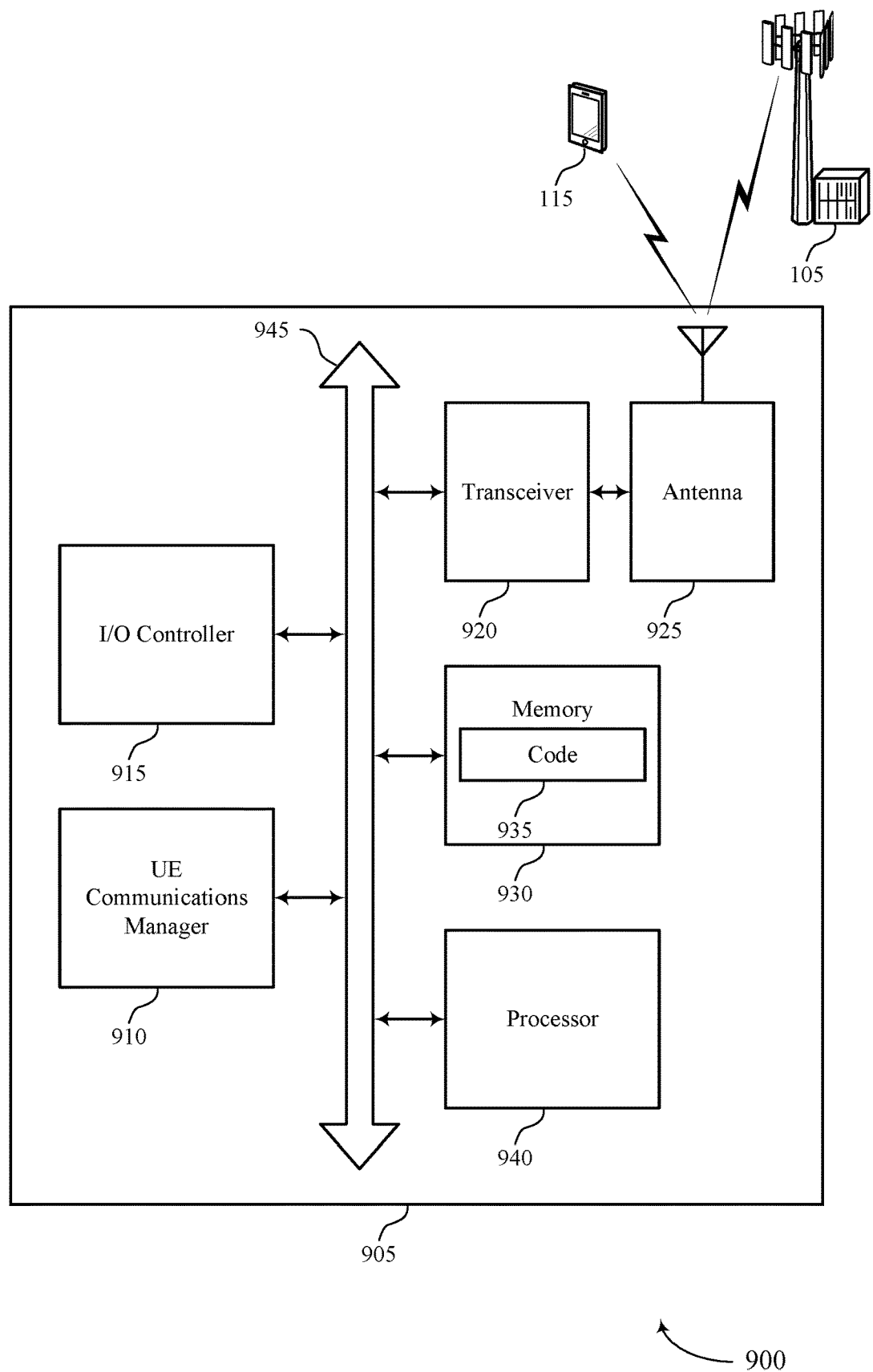
FIG. 9 shows a diagram of a system including a device that supports NR SSB related idle measurement configuration in accordance with aspects of the present disclosure.

FIG. 9 shows a diagram of a system 900 including a device 905 that supports NR SSB related idle measurement configuration in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a first message including a set of SSB measurement configurations, a first set of SSB frequencies, or a combination thereof, receive a second message different from the first message, the second message including a second set of SSB frequencies, measure a SSB frequency of the first set, a SSB frequency of the second set, or a combination thereof, where the measuring is according to a SSB measurement configuration of the set of SSB measurement configurations, and transmit a measurement report based on the measuring.

The UE communications manager 910 may also receive a first message including a first set of SSB measurement configurations and a first set of SSB frequencies, receive a second message different from the first message, the second message including a second set of SSB measurement configurations and a second set of SSB frequencies, measure a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof, and transmit a measurement report based on the measuring.

The UE communications manager 910 may also receive a first message including a set of SSB measurement configurations, or a first set of SSB frequencies, or a combination thereof, receive a second message including a second set of SSB frequencies absent in a sync raster, measure a SSB frequency of the first set, or a SSB frequency of the second set, or a combination thereof, where the measuring is according to a SSB measurement configuration of the set of SSB measurement configurations, and transmit a measurement report based on the measuring.

The UE communications manager 910 as described herein may be implemented to realize one or more potential advantages. One implementation may allow the device 905 to save power and increase battery life by communicating with base stations 105 (as shown in FIGS. 1 and 2) more efficiently. For example, the device 905 may efficiently obtain SSB related measurement configuration (e.g., SMTC information) transmitted by base stations 105, as the device 905 may be able to perform idle state measurements and inactive state measurements more effectively by having valid SSB related measurement configuration (e.g., SMTC information). Another implementation may promote low latency communications at the device 905.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting NR SSB related idle measurement configuration).

Figure 10:
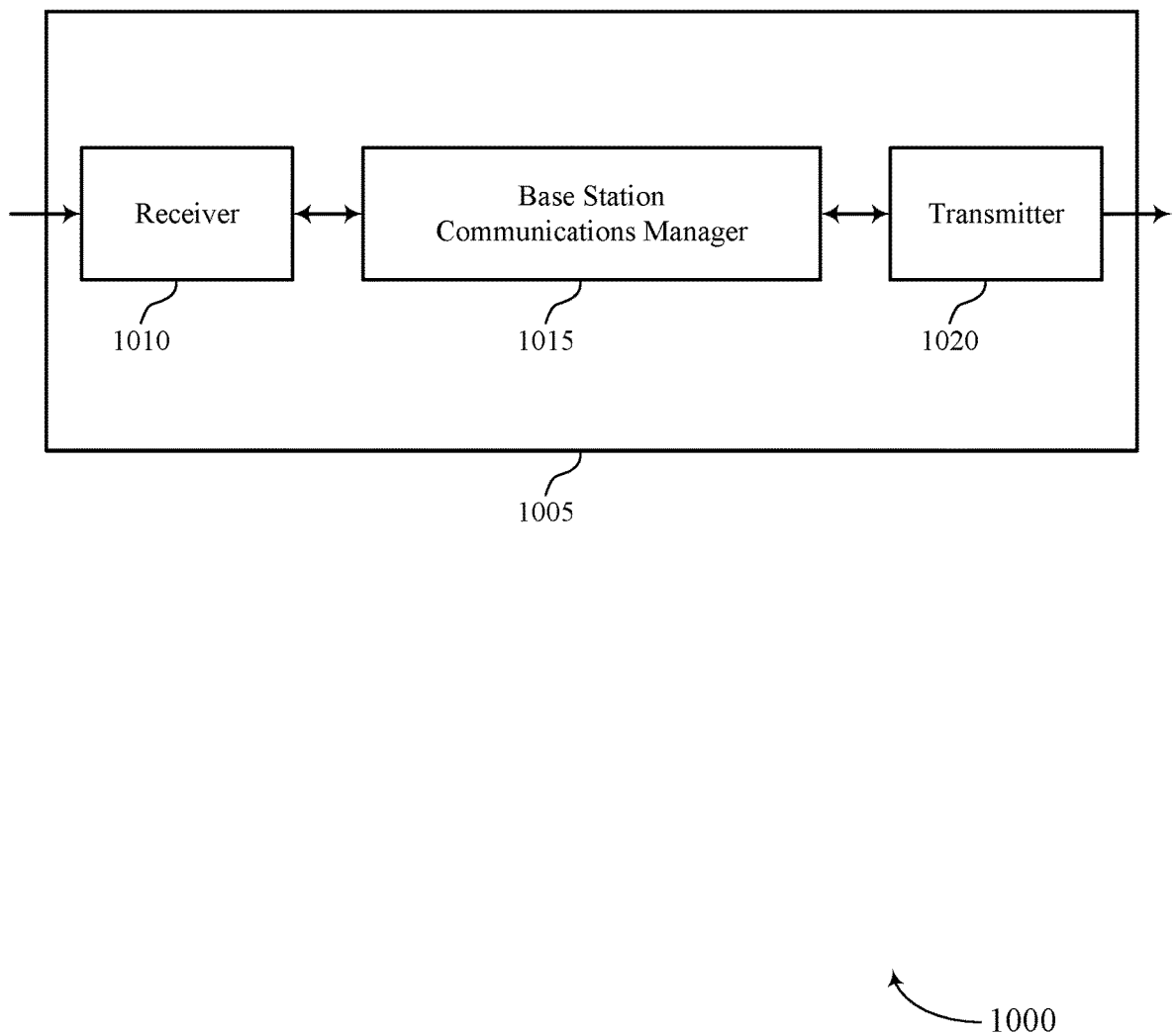
FIGS. 10 and 11 show block diagrams of devices that support NR SSB related idle measurement configuration in accordance with aspects of the present disclosure.

FIG. 10 shows a block diagram 1000 of a device 1005 that supports NR SSB related idle measurement configuration in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to NR SSB related idle measurement configuration, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit a first message including a set of SSB measurement configurations, a first set of SSB frequencies, or a combination thereof, transmit a second message different from the first message, the second message including a second set of SSB frequencies, and receive a measurement report based on the first message, or the second message, or a combination thereof. The base station communications manager 1015 may also transmit a first message including a first set of SSB measurement configurations and a first set of SSB frequencies, transmit a second message different from the first message, the second message including a second set of SSB measurement configurations and a second set of SSB frequencies, and receive a measurement report based on the first message, or the second message, or a combination thereof. The base station communications manager 1015 may also transmit a first message including a set of SSB measurement configurations, or a first set of SSB frequencies, or a combination thereof, transmit a second message including a second set of SSB frequencies absent in a sync raster, and receive a measurement report based on the first message, or the second message, or a combination thereof. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
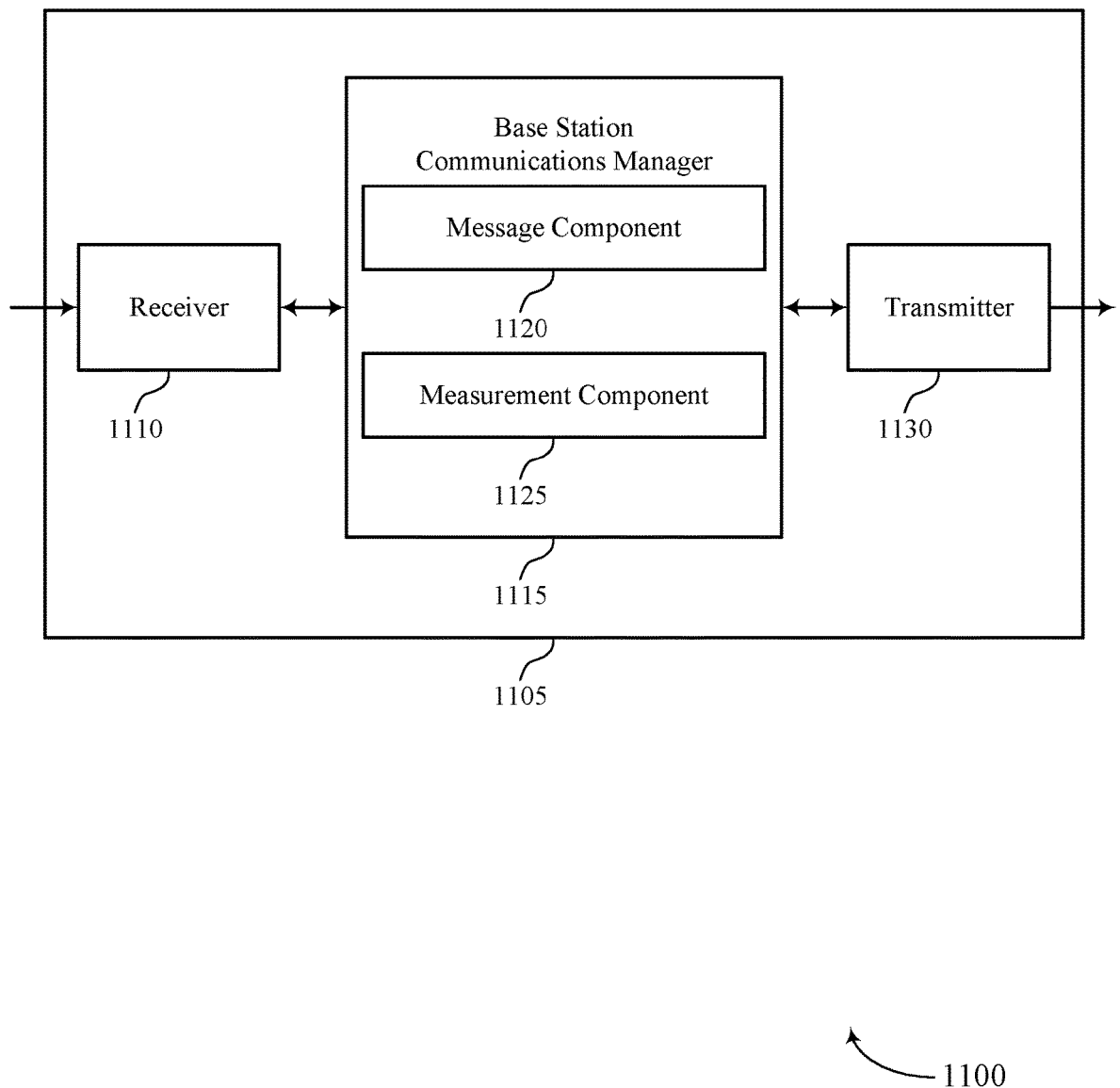

FIG. 11 shows a block diagram 1100 of a device 1105 that supports NR SSB related idle measurement configuration in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to NR SSB related idle measurement configuration, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a message component 1120 and a measurement component 1125. The base station communications manager 1115 may be an example of aspects of the base station communications manager 1310 described herein.

The message component 1120 may transmit a first message including a set of SSB measurement configurations, a first set of SSB frequencies, or a combination thereof and transmit a second message different from the first message, the second message including a second set of SSB frequencies. The measurement component 1125 may receive a measurement report based on the first message, or the second message, or a combination thereof. The message component 1120 may transmit a first message including a first set of SSB measurement configurations and a first set of SSB frequencies and transmit a second message different from the first message, the second message including a second set of SSB measurement configurations and a second set of SSB frequencies. The measurement component 1125 may receive a measurement report based on the first message, or the second message, or a combination thereof. The message component 1120 may transmit a first message including a set of SSB measurement configurations, or a first set of SSB frequencies, or a combination thereof and transmit a second message including a second set of SSB frequencies absent in a sync raster. The measurement component 1125 may receive a measurement report based on the first message, or the second message, or a combination thereof.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
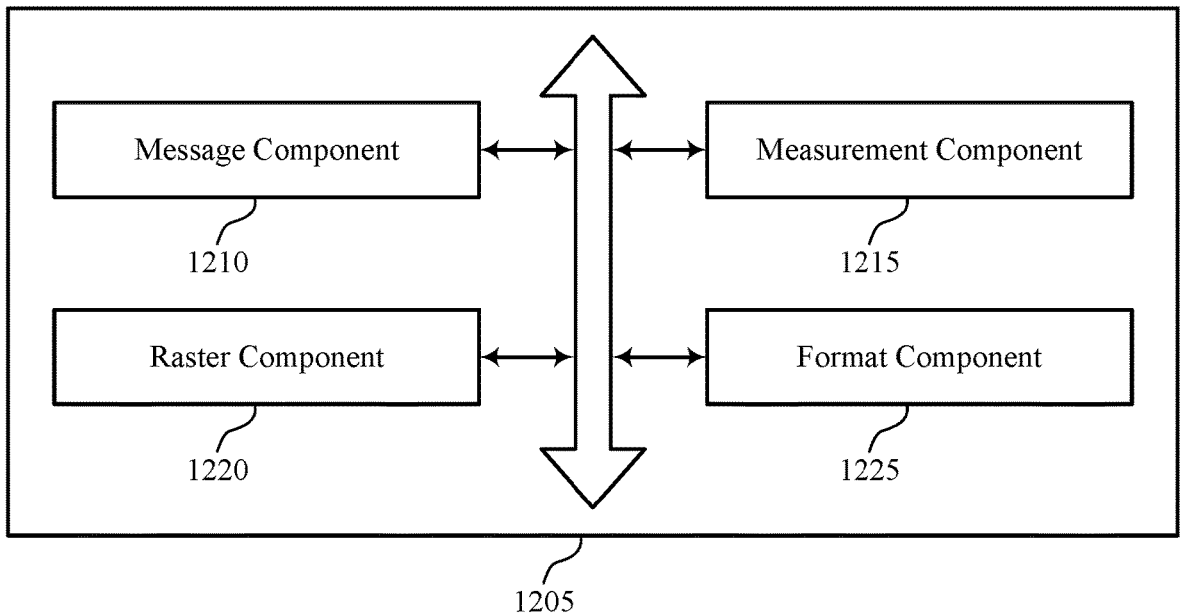
FIG. 12 shows a block diagram of a base station communications manager that supports NR SSB related idle measurement configuration in accordance with aspects of the present disclosure.

FIG. 12 shows a block diagram 1200 of a base station communications manager 1205 that supports NR SSB related idle measurement configuration in accordance with aspects of the present disclosure. The base station communications manager 1205 may be an example of aspects of a base station communications manager 1015, a base station communications manager 1115, or a base station communications manager 1310 described herein. The base station communications manager 1205 may include a message component 1210, a measurement component 1215, a raster component 1220, and a format component 1225. Each of these modules may communicate, directly or indirectly, with one another (e.g., via one or more buses).

The message component 1210 may transmit a first message including a set of SSB measurement configurations, a first set of SSB frequencies, or a combination thereof. In some examples, the message component 1210 may transmit a second message different from the first message, the second message including a second set of SSB frequencies. In some examples, the message component 1210 may transmit a first message including a first set of SSB measurement configurations and a first set of SSB frequencies. In some examples, the message component 1210 may transmit a second message different from the first message, the second message including a second set of SSB measurement configurations and a second set of SSB frequencies. In some examples, the message component 1210 may transmit a first message including a set of SSB measurement configurations, or a first set of SSB frequencies, or a combination thereof. In some examples, the message component 1210 may transmit a second message including a second set of SSB frequencies absent in a sync raster. In some examples, the message component 1210) may transmit a SIB including the set of SSB measurement configurations, or the first set of SSB frequencies, or a combination thereof.

In some examples, the message component 1210 may transmit an RRC message including the second set of SSB frequencies. In some examples, the message component 1210 may transmit the RRC message is based on a network synchronization. In some examples, the message component 1210 may transmit a SIB including the first set of SSB measurement configurations or the first set of SSB frequencies, or a combination thereof. In some examples, the message component 1210 may transmit an RRC message including the second set of SSB measurement configurations or the second set of SSB frequencies. In some examples, the message component 1210 may transmit the RRC message including the second set of SSB measurement configurations is based on a network synchronization. In some cases, the RRC message includes an RRC release message. In some cases, the first message, or the second message, or a combination thereof includes a SMTC.

In some cases, the first message, or the second message, or a combination thereof includes a SMTC. In some cases, the first message, or the second message, or a combination thereof includes an indication of whether a SMTC is valid during a cell reselection. In some cases, the first message includes an RRC message or a SIB. In some cases, the second message includes an RRC message or a SIB. In some cases, the RRC message includes an RRC release message. In some cases, the second message is different from the first message.

The measurement component 1215 may receive a measurement report based on the first message, or the second message, or a combination thereof. In some examples, the measurement component 1215 may receive a measurement report based on the first message, or the second message, or a combination thereof. In some examples, the measurement component 1215 may receive a measurement report based on the first message, or the second message, or a combination thereof.

The raster component 1220 may identify the SSB frequency of the first set, or the SSB frequency of the second set, or a combination thereof are present in a sync raster or absent in the sync raster. In some cases, the SSB frequency of the first set, or the SSB frequency of the second set, or a combination thereof are present in a sync raster or absent in the sync raster. The format component 1225 may transmit the set of SSB measurement configurations in the NR SIB or the legacy-based SIB based on the presence of the SSB frequency of the first set in the sync raster. In some examples, the format component 1225 may transmit the set of SSB measurement configurations in the NR SIB or the legacy-based SIB based on the absence of the SSB frequency of the first set in the sync raster. In some examples, the format component 1225 may transmit the first set of SSB measurement configurations in the NR SIB or the legacy-based SIB based on the presence of the SSB frequency of the first set of SSB frequencies in the sync raster.

In some examples, the format component 1225 may transmit the first set of synchronization signal block measurement configurations in the NR SIB or the legacy-based SIB based on the absence of the synchronization signal block frequency of the first set of synchronization signal block frequencies in the sync raster. In some cases, the first message includes a first format based on a presence of the SSB frequency of the first set in the sync raster, the set of SSB measurement configurations relating to a cell selection by the UE or a cell reselection by the UE. In some cases, the first format includes a NR SIB or a legacy-based SIB.

In some cases, the first message includes a second format based on an absence of the SSB frequency of the first set in the sync raster, the set of SSB measurement configurations, or a combination thereof. In some cases, the second format includes a NR SIB or a legacy-based SIB. In some cases, the second format is different from the first format. In some cases, the first message includes a first format based on a presence of the SSB frequency of the first set of SSB frequencies in the sync raster, the first set of SSB measurement configurations, or a combination thereof. In some cases, the first format includes a NR SIB or a legacy-based SIB. In some cases, the first message includes a second format based on an absence of the SSB frequency of the first set of SSB frequencies in the sync raster, the first set of SSB measurement configurations, or a combination thereof.

Figure 13:
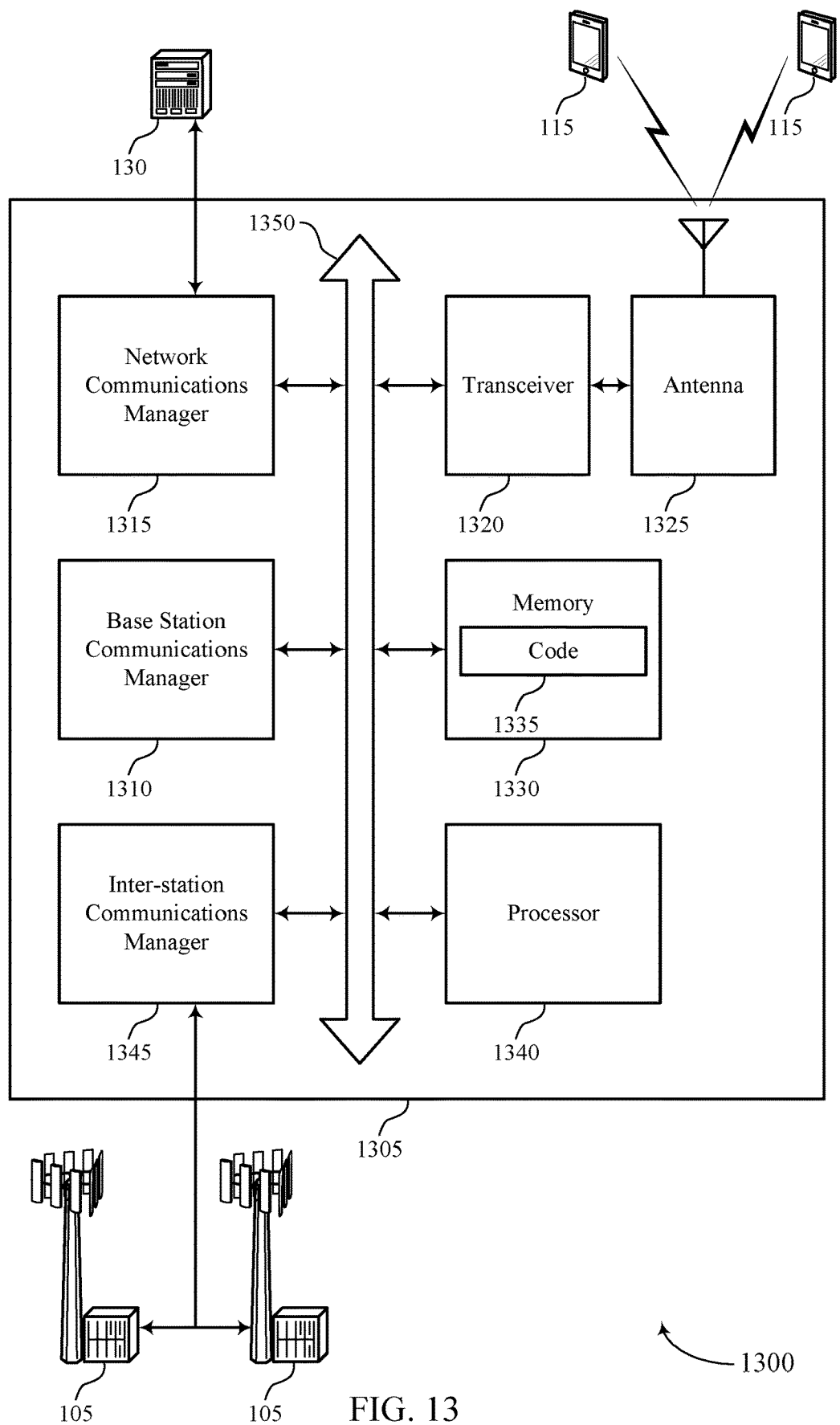
FIG. 13 shows a diagram of a system including a device that supports NR SSB related idle measurement configuration in accordance with aspects of the present disclosure.

FIG. 13 shows a diagram of a system 1300 including a device 1305 that supports NR SSB related idle measurement configuration in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit a first message including a set of SSB measurement configurations, a first set of SSB frequencies, or a combination thereof, transmit a second message different from the first message, the second message including a second set of SSB frequencies, and receive a measurement report based on the first message, or the second message, or a combination thereof. The base station communications manager 1310 may also transmit a first message including a first set of SSB measurement configurations and a first set of SSB frequencies, transmit a second message different from the first message, the second message including a second set of SSB measurement configurations and a second set of SSB frequencies, and receive a measurement report based on the first message, or the second message, or a combination thereof. The base station communications manager 1310 may also transmit a first message including a set of SSB measurement configurations, or a first set of SSB frequencies, or a combination thereof, transmit a second message including a second set of SSB frequencies absent in a sync raster, and receive a measurement report based on the first message, or the second message, or a combination thereof.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting NR SSB related idle measurement configuration).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
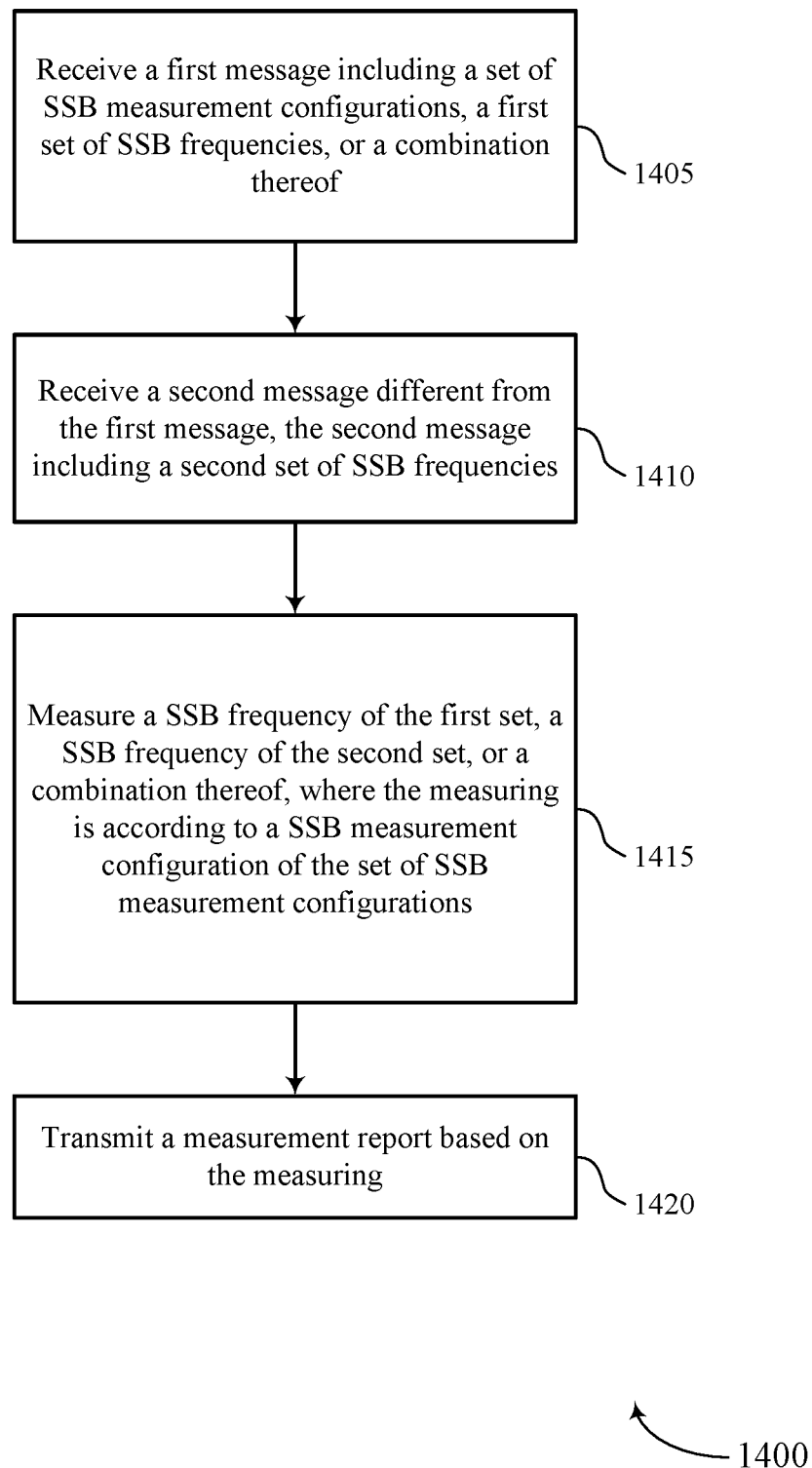
FIGS. 14 through 19 show flowcharts illustrating methods that support NR SSB related idle measurement configuration in accordance with aspects of the present disclosure.

FIG. 14 shows a flowchart illustrating a method 1400 that supports NR SSB related idle measurement configuration in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first message including a set of SSB measurement configurations, a first set of SSB frequencies, or a combination thereof. The operations of 1405 may be performed according to the methods described herein. In some examples, aspects of the operations of 1405 may be performed by a message component as described with reference to FIGS. 6 through 9.

At 1410, the UE may receive a second message different from the first message, the second message including a second set of SSB frequencies. The operations of 1410 may be performed according to the methods described herein. In some examples, aspects of the operations of 1410 may be performed by a message component as described with reference to FIGS. 6 through 9.

At 1415, the UE may measure an SSB frequency of the first set, an SSB frequency of the second set, or a combination thereof, where the measuring is according to an SSB measurement configuration of the set of SSB measurement configurations. The operations of 1415 may be performed according to the methods described herein. In some examples, aspects of the operations of 1415 may be performed by a measurement component as described with reference to FIGS. 6 through 9.

At 1420, the UE may transmit a measurement report based on the measuring. The operations of 1420 may be performed according to the methods described herein. In some examples, aspects of the operations of 1420 may be performed by a measurement component as described with reference to FIGS. 6 through 9.

Figure 15:
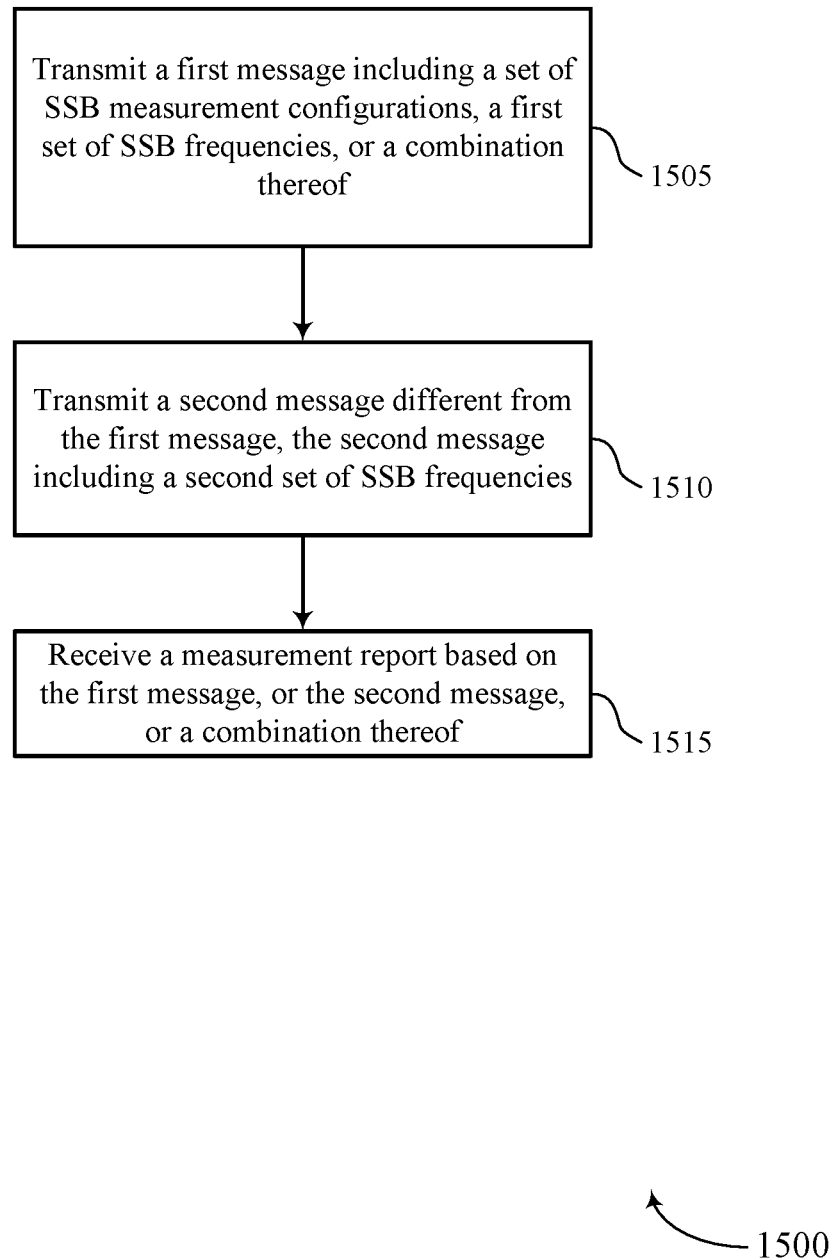

FIG. 15 shows a flowchart illustrating a method 1500 that supports NR SSB related idle measurement configuration in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit a first message including a set of SSB measurement configurations, a first set of SSB frequencies, or a combination thereof. The operations of 1505 may be performed according to the methods described herein. In some examples, aspects of the operations of 1505 may be performed by a message component as described with reference to FIGS. 10 through 13.

At 1510, the base station may transmit a second message different from the first message, the second message including a second set of SSB frequencies. The operations of 1510 may be performed according to the methods described herein. In some examples, aspects of the operations of 1510 may be performed by a message component as described with reference to FIGS. 10 through 13.

At 1515, the base station may receive a measurement report based on the first message, or the second message, or a combination thereof. The operations of 1515 may be performed according to the methods described herein. In some examples, aspects of the operations of 1515 may be performed by a measurement component as described with reference to FIGS. 10 through 13.

Figure 16:
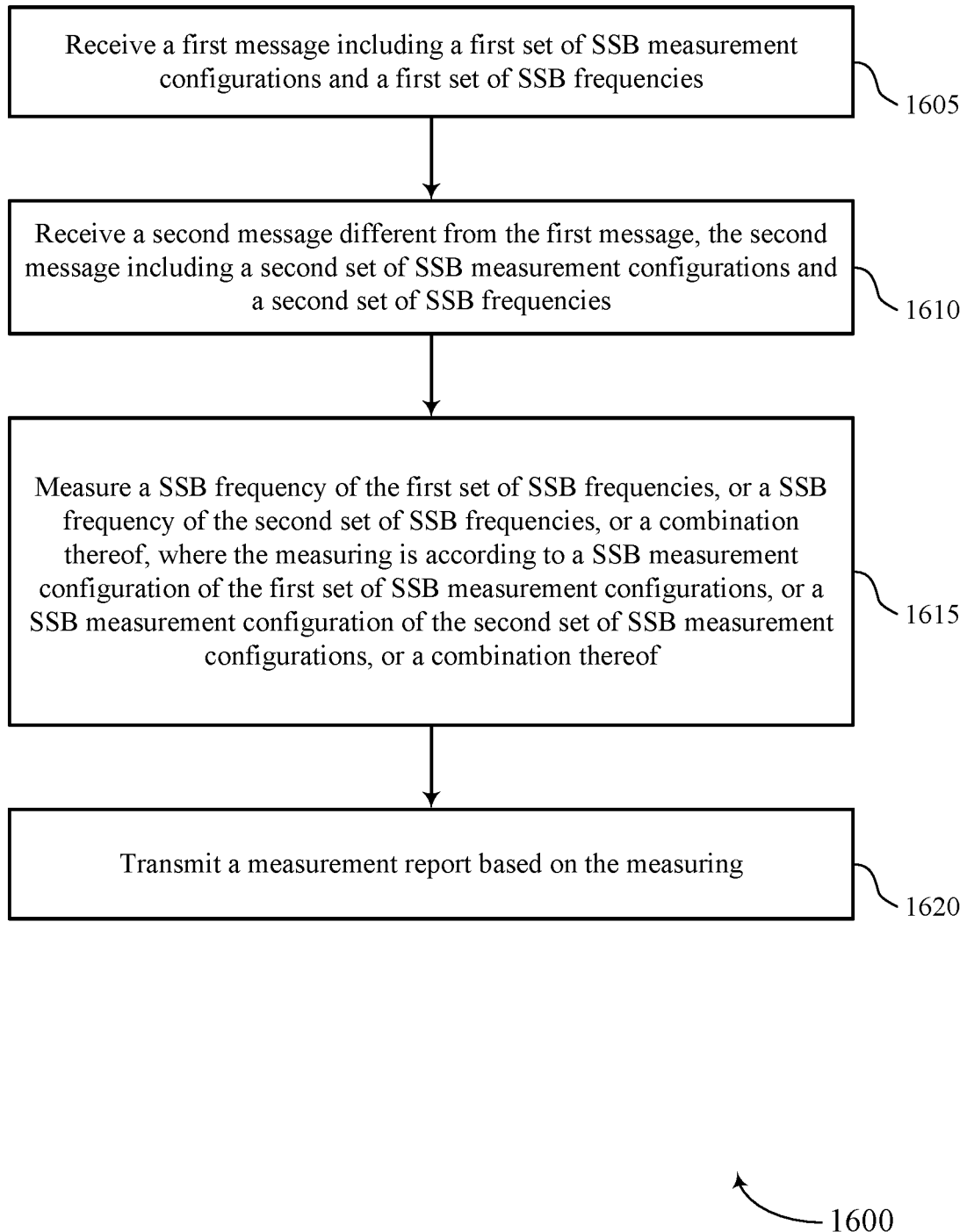

FIG. 16 shows a flowchart illustrating a method 1600 that supports NR SSB related idle measurement configuration in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a first message including a first set of SSB measurement configurations and a first set of SSB frequencies. The operations of 1605 may be performed according to the methods described herein. In some examples, aspects of the operations of 1605 may be performed by a message component as described with reference to FIGS. 6 through 9.

At 1610, the UE may receive a second message different from the first message, the second message including a second set of SSB measurement configurations and a second set of SSB frequencies. The operations of 1610 may be performed according to the methods described herein. In some examples, aspects of the operations of 1610 may be performed by a message component as described with reference to FIGS. 6 through 9.

At 1615, the UE may measure a SSB frequency of the first set of SSB frequencies, or a SSB frequency of the second set of SSB frequencies, or a combination thereof, where the measuring is according to a SSB measurement configuration of the first set of SSB measurement configurations, or a SSB measurement configuration of the second set of SSB measurement configurations, or a combination thereof. The operations of 1615 may be performed according to the methods described herein. In some examples, aspects of the operations of 1615 may be performed by a measurement component as described with reference to FIGS. 6 through 9.

At 1620, the UE may transmit a measurement report based on the measuring. The operations of 1620 may be performed according to the methods described herein. In some examples, aspects of the operations of 1620 may be performed by a measurement component as described with reference to FIGS. 6 through 9.

Figure 17:
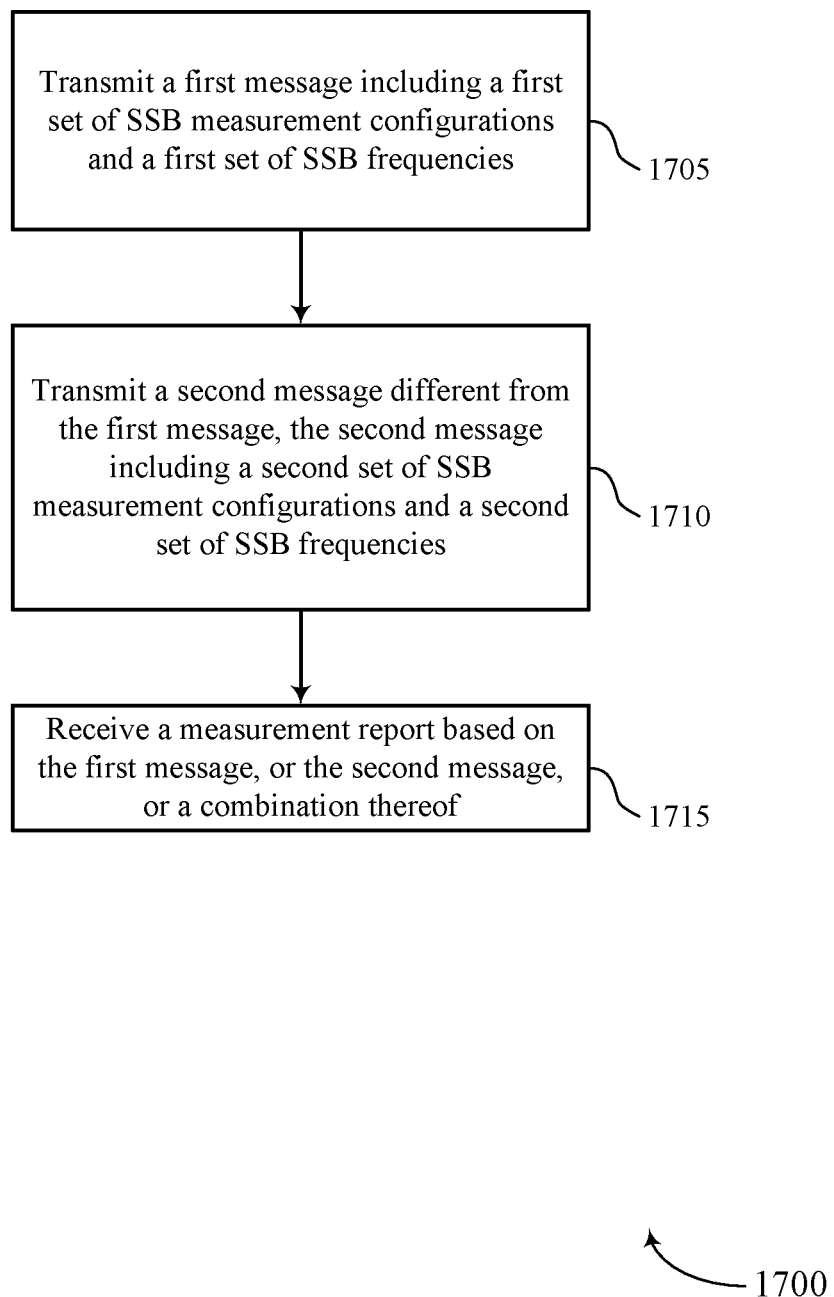

FIG. 17 shows a flowchart illustrating a method 1700 that supports NR SSB related idle measurement configuration in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a first message including a first set of SSB measurement configurations and a first set of SSB frequencies. The operations of 1705 may be performed according to the methods described herein. In some examples, aspects of the operations of 1705 may be performed by a message component as described with reference to FIGS. 10 through 13.

At 1710, the base station may transmit a second message different from the first message, the second message including a second set of SSB measurement configurations and a second set of SSB frequencies. The operations of 1710 may be performed according to the methods described herein. In some examples, aspects of the operations of 1710 may be performed by a message component as described with reference to FIGS. 10 through 13.

At 1715, the base station may receive a measurement report based on the first message, or the second message, or a combination thereof. The operations of 1715 may be performed according to the methods described herein. In some examples, aspects of the operations of 1715 may be performed by a measurement component as described with reference to FIGS. 10 through 13.

Figure 18:
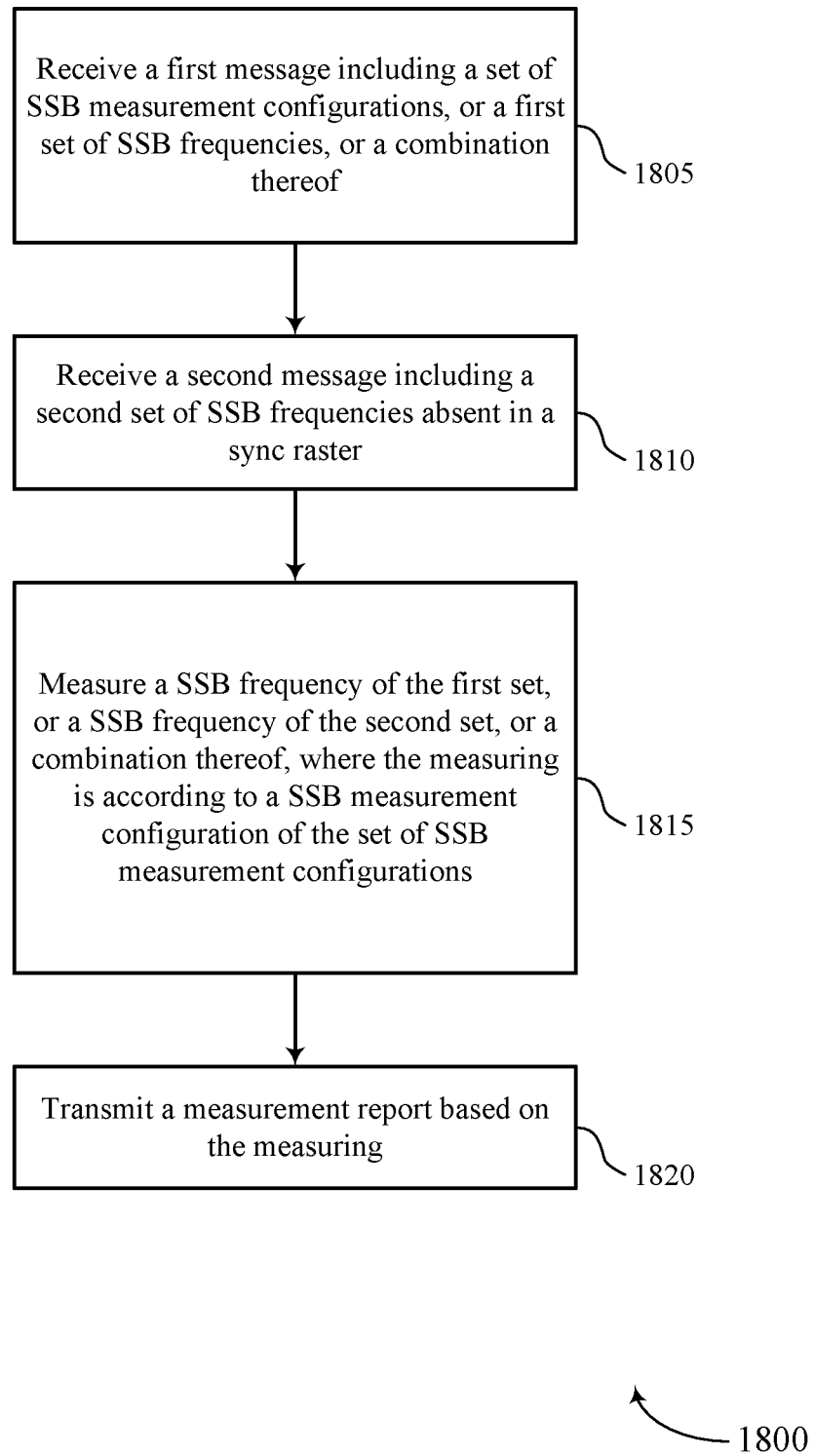

FIG. 18 shows a flowchart illustrating a method 1800 that supports NR SSB related idle measurement configuration in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive a first message including a set of SSB measurement configurations, or a first set of SSB frequencies, or a combination thereof. The operations of 1805 may be performed according to the methods described herein. In some examples, aspects of the operations of 1805 may be performed by a message component as described with reference to FIGS. 6 through 9.

At 1810, the UE may receive a second message including a second set of SSB frequencies absent in a sync raster. The operations of 1810 may be performed according to the methods described herein. In some examples, aspects of the operations of 1810 may be performed by a message component as described with reference to FIGS. 6 through 9.

At 1815, the UE may measure an SSB frequency of the first set, or an SSB frequency of the second set, or a combination thereof, where the measuring is according to an SSB measurement configuration of the set of SSB measurement configurations. The operations of 1815 may be performed according to the methods described herein. In some examples, aspects of the operations of 1815 may be performed by a measurement component as described with reference to FIGS. 6 through 9.

At 1820, the UE may transmit a measurement report based on the measuring. The operations of 1820 may be performed according to the methods described herein. In some examples, aspects of the operations of 1820 may be performed by a measurement component as described with reference to FIGS. 6 through 9.

Figure 19:
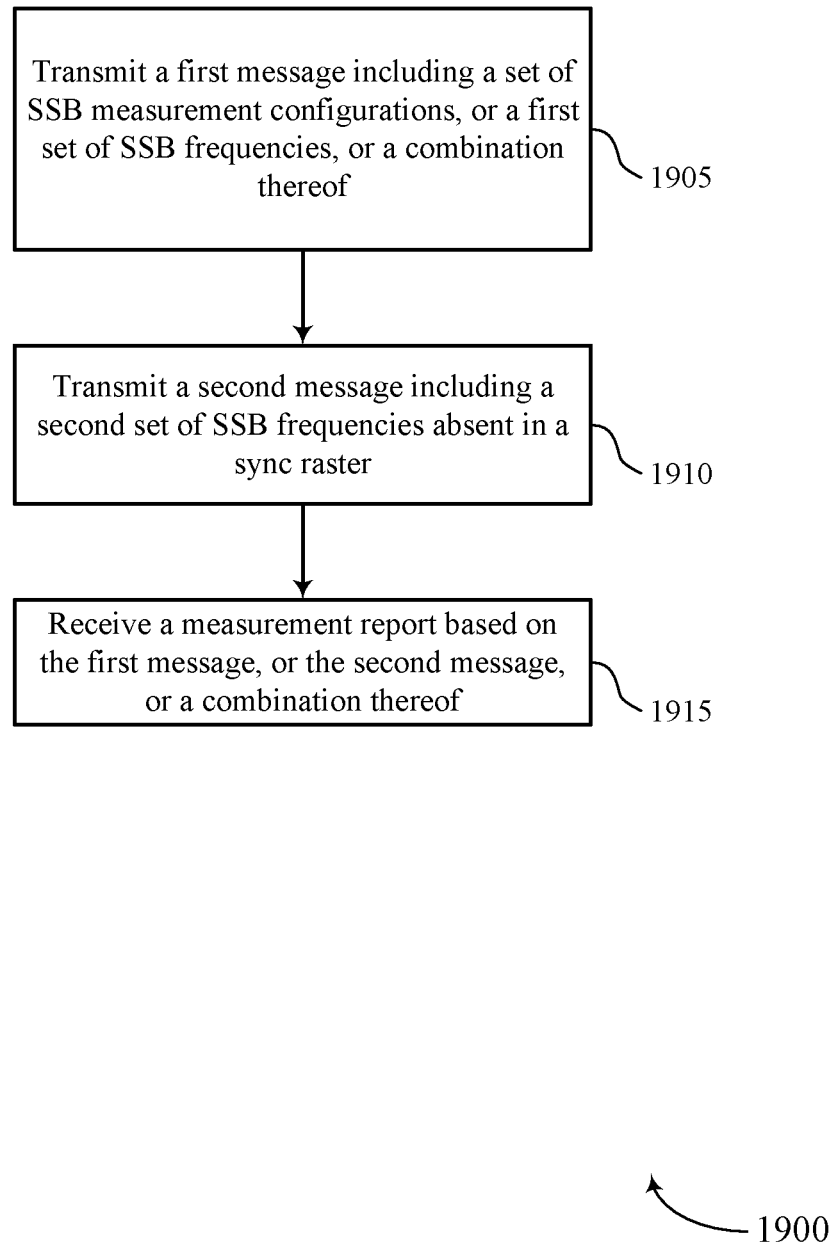

FIG. 19 shows a flowchart illustrating a method 1900 that supports NR SSB related idle measurement configuration in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a first message including a set of SSB measurement configurations, or a first set of SSB frequencies, or a combination thereof. The operations of 1905 may be performed according to the methods described herein. In some examples, aspects of the operations of 1905 may be performed by a message component as described with reference to FIGS. 10 through 13.

At 1910, the base station may transmit a second message including a second set of SSB frequencies absent in a sync raster. The operations of 1910 may be performed according to the methods described herein. In some examples, aspects of the operations of 1910 may be performed by a message component as described with reference to FIGS. 10 through 13.

At 1915, the base station may receive a measurement report based on the first message, or the second message, or a combination thereof. The operations of 1915 may be performed according to the methods described herein. In some examples, aspects of the operations of 1915 may be performed by a measurement component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a first message comprising a set of synchronization signal block measurement configurations, a first set of synchronization signal block frequencies, or a combination thereof;
receiving a second message different from the first message, the second message comprising a second set of synchronization signal block frequencies;
measuring a synchronization signal block frequency of the first set, a synchronization signal block frequency of the second set, or a combination thereof, wherein the measuring is according to a synchronization signal block measurement configuration of the set of synchronization signal block measurement configurations;
transmitting a measurement report based at least in part on the measuring;
identifying a first synchronization signal block-based measurement timing configuration associated with a serving cell based at least in part on the first message, or the second message, or a combination thereof;
identifying a second synchronization signal block-based measurement timing configuration associated with a target cell based at least in part on a third message, the third message comprising a system information block; and
replacing the first synchronization signal block-based measurement timing configuration of the serving cell with the second synchronization signal block-based measurement timing configuration associated with the target cell.

2. The method of claim 1, further comprising:
determining a difference between the first set and the second set based at least in part on comparing synchronization signal block frequencies of the first set to synchronization signal block frequencies of the second set,
wherein measuring the synchronization signal block frequency of the first set, the synchronization signal block frequency of the second set, or a combination thereof based at least in part on the difference between the first set and the second set.

3. The method of claim 2, further comprising:
ignoring the first set based at least in part on the difference between the first set and the second set, wherein measuring the synchronization signal block frequency of the first set, the synchronization signal block frequency of the second set, or a combination thereof comprises:
measuring the synchronization signal block frequency of the second set; and
refraining from measuring the synchronization signal block frequency of the first set based at least in part on the ignoring.

4. The method of claim 1, further comprising:
determining a subset of synchronization signal block frequencies based at least in part on comparing synchronization signal block frequencies of the first set to synchronization signal block frequencies of the second set, the subset of synchronization signal block frequencies comprising common synchronization signal block frequencies between the first set and the second set; and
measuring the common synchronization signal block frequencies, wherein the common synchronization signal block frequencies comprises the synchronization signal block frequency of the first set and the synchronization signal block frequency of the second set.

5. The method of claim 1, wherein the synchronization signal block frequency of the first set, or the synchronization signal block frequency of the second set, or a combination thereof are present in a sync raster or absent in the sync raster.

6. The method of claim 5, wherein the first message comprises a first format based at least in part on a presence of the synchronization signal block frequency of the first set in the sync raster, the set of synchronization signal block measurement configurations relating to a cell selection by the UE or a cell reselection by the UE.

7. The method of claim 6, wherein the first format comprises a new radio system information block or a legacy-based system information block.

8. The method of claim 7, wherein receiving the first message comprises:
receiving the set of synchronization signal block measurement configurations in the new radio system information block or the legacy-based system information block based at least in part on the presence of the synchronization signal block frequency of the first set in the sync raster.

9. The method of claim 6, wherein the first message comprises a second format based at least in part on an absence of the synchronization signal block frequency of the first set in the sync raster, the set of synchronization signal block measurement configurations, or a combination thereof relating to one or more of an idle state measurement by the UE or an inactive state measurement by the UE.

10. The method of claim 9, wherein the second format comprises a new radio system information block or a legacy-based system information block.

11. The method of claim 10, wherein receiving the first message comprises:
receiving the set of synchronization signal block measurement configurations in the new radio system information block or the legacy-based system information block based at least in part on the absence of the synchronization signal block frequency of the first set in the sync raster.

12. The method of claim 9, wherein the second format is different from the first format.

13. The method of claim 5, wherein the synchronization signal block frequency of the first set, or the synchronization signal block frequency of the second set, or a combination therefore are present in the sync raster or absent in the sync raster.

14. The method of claim 1, wherein each synchronization signal block frequency of the first set or each synchronization signal block frequency of the second set correspond to synchronization signal block measurement configurations of the set of synchronization signal block measurement configurations.

15. The method of claim 1, wherein the synchronization signal block measurement configuration comprises one or more of a synchronization signal block-based measurement timing configuration, a subcarrier spacing, a synchronization signal block index, a radio frequency spectrum band index, a measurement-type, and a cell quantity configuration.

16. The method of claim 1, wherein receiving the first message comprises:
receiving a system information block comprising the set of synchronization signal block measurement configurations, or the first set of synchronization signal block frequencies, or a combination thereof.

17. The method of claim 1, wherein receiving the second message comprises:
receiving a radio resource control message comprising the second set of synchronization signal block frequencies.

18. The method of claim 17, wherein the radio resource control message comprises a radio resource control release message.

19. The method of claim 1, further comprising:
receiving the first message, or the second message, or a combination thereof from a serving cell associated with the UE.

20. The method of claim 1, further comprising:
identifying the second set of synchronization signal block frequencies, or a set of neighboring cells, or a combination thereof based at least in part on the second message, wherein the second set of synchronization signal block frequencies comprises new radio set of synchronization signal block frequencies.

21. The method of claim 20, further comprising:
identifying presence of one or more synchronization signal block frequencies of the new radio set of synchronization signal block frequencies in a sync raster;
identifying one or more synchronization signal block measurement configurations associated with the one or more synchronization signal block frequencies of the new radio set of synchronization signal block frequencies in the sync raster based at least in part on a new radio system information block or a legacy-based system information block; and
measuring the one or more synchronization signal block frequencies of the new radio set of synchronization signal block frequencies according to the one or more synchronization signal block measurement configurations associated with the one or more synchronization signal block frequencies of the new radio set of synchronization signal block frequencies in the sync raster.

22. The method of claim 20, further comprising:
identifying absence of one or more synchronization signal block frequencies of the new radio set of synchronization signal block frequencies in a sync raster;
identifying one or more synchronization signal block measurement configurations associated with the one or more synchronization signal block frequencies of the new radio set of synchronization signal block frequencies based at least in part on a new radio system information block or a legacy-based system information block; and
measuring the one or more synchronization signal block frequencies of the new radio set of synchronization signal block frequencies according to the one or more synchronization signal block measurement configurations associated with the one or more synchronization signal block frequencies of the new radio set of synchronization signal block frequencies.

23. The method of claim 1, further comprising:
determining an absence of the synchronization signal block measurement configuration of the set of synchronization signal block measurement configurations associated with the synchronization signal block frequency of the first set, or the synchronization signal block frequency of the second set, or a combination thereof; and
refraining from measuring one or more of the synchronization signal block frequency of the first set, or the synchronization signal block frequency of the second set, or a combination thereof based at least in part on the absence of the synchronization signal block measurement configuration.

24. The method of claim 1, further comprising:
identifying a radio resource control mode, wherein the radio resource control mode comprises an idle mode or an inactive mode, wherein measuring the synchronization signal block frequency of the first set, or the synchronization signal block frequency of the second set, or a combination thereof comprises:
measuring, while in the idle mode or the inactive mode, the synchronization signal block frequency of the first set, or the synchronization signal block frequency of the second set, or a combination thereof according to the synchronization signal block measurements configuration of the set of synchronization signal block measurement configurations.

25. The method of claim 1, wherein:
measuring the synchronization signal block frequency of the first set, or the synchronization signal block frequency of the second set, or a combination thereof based at least in part on a carrier aggregation capability or a multi-radio access technology dual-connectivity capability.

26. A method for wireless communication at a base station, comprising:
transmitting a first message comprising a set of synchronization signal block measurement configurations, a first set of synchronization signal block frequencies, or a combination thereof;
transmitting a second message different from the first message, the second message comprising a second set of synchronization signal block frequencies;
receiving a measurement report based at least in part on the first message, or the second message, or a combination thereof;
identifying a first synchronization signal block-based measurement timing configuration associated with a serving cell based at least in part on the first message, or the second message, or a combination thereof;
identifying a second synchronization signal block-based measurement timing configuration associated with a target cell based at least in part on a third message, the third message comprising a system information block; and
replacing the first synchronization signal block-based measurement timing configuration of the serving cell with the second synchronization signal block-based measurement timing configuration associated with the target cell.

27. The method of claim 26, wherein the synchronization signal block frequency of the first set, or the synchronization signal block frequency of the second set, or a combination thereof are present in a sync raster or absent in the sync raster.

28. A method for wireless communication at a user equipment (UE), comprising:
receiving a first message comprising a first set of synchronization signal block measurement configurations and a first set of synchronization signal block frequencies;
receiving a second message different from the first message, the second message comprising a second set of synchronization signal block measurement configurations and a second set of synchronization signal block frequencies;
measuring a synchronization signal block frequency of the first set of synchronization signal block frequencies, or a synchronization signal block frequency of the second set of SSB frequencies, or a combination thereof, wherein the measuring is according to a synchronization signal block measurement configuration of the first set of synchronization signal block measurement configurations, or a synchronization signal block measurement configuration of the second set of synchronization signal block measurement configurations, or a combination thereof;
transmitting a measurement report based at least in part on the measuring;
identifying a first synchronization signal block-based measurement timing configuration associated with a serving cell based at least in part on the first message, or the second message, or a combination thereof;
identifying a second synchronization signal block-based measurement timing configuration associated with a target cell based at least in part on a third message, the third message comprising a system information block; and
replacing the first synchronization signal block-based measurement timing configuration of the serving cell with the second synchronization signal block-based measurement timing configuration associated with the target cell.

29. A method for wireless communication at a user equipment (UE), comprising:
receiving a first message comprising a set of synchronization signal block measurement configurations, or a first set of synchronization signal block frequencies, or a combination thereof;
receiving a second message comprising a second set of synchronization signal block frequencies absent in a sync raster;
measuring a synchronization signal block frequency of the first set, or a synchronization signal block frequency of the second set, or a combination thereof, where the measuring is according to a synchronization signal block measurement configuration of the set of synchronization signal block measurement configurations;
transmitting a measurement report based at least in part on the measuring;
identifying a first synchronization signal block-based measurement timing configuration associated with a serving cell based at least in part on the first message, or the second message, or a combination thereof;
identifying a second synchronization signal block-based measurement timing configuration associated with a target cell based at least in part on a third message, the third message comprising a system information block; and
replacing the first synchronization signal block-based measurement timing configuration of the serving cell with the second synchronization signal block-based measurement timing configuration associated with the target cell.

* * * * *